(12) United States Patent
Takahashi

(10) Patent No.: US 9,253,359 B2
(45) Date of Patent: Feb. 2, 2016

(54) CONTACT IMAGE SENSOR UNIT INCLUDING A DETACHABLE LIGHT GUIDE SUPPORTING MEMBER AND IMAGE READING APPARATUS USING THE SAME

(75) Inventor: Hidehisa Takahashi, Kanagawa (JP)

(73) Assignee: CANON COMPONENTS, INC., Saitama (JP)

(*) Notice: Subject to any disclaimer, the term of this patent is extended or adjusted under 35 U.S.C. 154(b) by 255 days.

(21) Appl. No.: 13/519,353

(22) PCT Filed: Nov. 2, 2010

(86) PCT No.: PCT/JP2010/069500
§ 371 (c)(1),
(2), (4) Date: Jun. 27, 2012

(87) PCT Pub. No.: WO2011/080962
PCT Pub. Date: Jul. 7, 2011

(65) Prior Publication Data
US 2013/0009037 A1    Jan. 10, 2013

(30) Foreign Application Priority Data

Dec. 28, 2009  (JP) .................. 2009-296777

(51) Int. Cl.
*H04N 1/031* (2006.01)
*H04N 1/028* (2006.01)

(52) U.S. Cl.
CPC ......... *H04N 1/0318* (2013.01); *H04N 1/02835* (2013.01); *H04N 2201/02435* (2013.01);
(Continued)

(58) Field of Classification Search
CPC ............ H04N 1/02835; H04N 1/0318; H04N 1/00583; H04N 1/00541; H04N 1/00557; H04N 1/00559; H04N 1/02418; H04N 1/0249
USPC ............... 250/208.1, 239, 234, 235; 358/480, 358/482–484, 494, 496–498
See application file for complete search history.

(56) References Cited

U.S. PATENT DOCUMENTS 5,119,232 A    6/1992  Daley et al.
5,166,832 A    11/1992 Zychowicz
(Continued)

FOREIGN PATENT DOCUMENTS

CN    101052088 A    10/2007
DE    19922304 A1    1/2000
(Continued)

OTHER PUBLICATIONS

Cheng Hong et al. "A color correction method based on standard white board" Journal of Agricultural University of Hebei, vol. 30, No. 4, pp. 105-109. Jul. 2007 English Abstract provided. Cited in pending U.S. Appl. No. 13/333,751.
(Continued)

*Primary Examiner* — Georgia Y Epps
*Assistant Examiner* — Carolynn A Moore
(74) *Attorney, Agent, or Firm* — Rossi, Kimms & McDowell LLP

(57) ABSTRACT

A contact image sensor unit includes: a light source (10) illuminating an original; a rod-like light guide (11) guiding light from the light source to the original; an imaging element (12) forming reflected light from the original on a plurality of photoelectric conversion elements; a sensor substrate (14) on which the plurality of photoelectric conversion elements are mounted; a frame (15) to which they are attached and which has a positioning part (200) for attaching the light guide (11) thereto; and a supporting member (16) which attachably/detachably supports the light guide (11) and is attachably/detachably attached to the positioning part (200). Since the light guide (11) can be attached to the frame (15) without using an adhesive, the deformation of the light guide (11), the warpage of the contact image sensor unit and so on can be prevented.

21 Claims, 14 Drawing Sheets

(52) U.S. Cl.
CPC .......... *H04N2201/02445* (2013.01); *H04N 2201/02456* (2013.01); *H04N 2201/02458* (2013.01); *H04N 2201/02462* (2013.01); *H04N 2201/02464* (2013.01); *H04N 2201/02472* (2013.01); *H04N 2201/02474* (2013.01); *H04N 2201/02483* (2013.01); *H04N 2201/02485* (2013.01); *H04N 2201/03112* (2013.01); *H04N 2201/03125* (2013.01); *H04N 2201/03129* (2013.01); *H04N 2201/03141* (2013.01); *H04N 2201/03145* (2013.01)

(56) References Cited

U.S. PATENT DOCUMENTS

| | | | |
|---|---|---|---|
| 5,182,445 | A | 1/1993 | Yamashita |
| 5,263,077 | A | 11/1993 | Cowan et al. |
| 5,673,122 | A | 9/1997 | Omori |
| 5,780,840 | A | 7/1998 | Lee et al. |
| 5,864,408 | A | 1/1999 | Kumashiro |
| 5,953,133 | A | 9/1999 | Fujimiya et al. |
| 6,094,281 | A | 7/2000 | Nakai et al. |
| 6,166,832 | A | 12/2000 | Fujimoto |
| 6,426,807 | B1 | 7/2002 | Kawai et al. |
| 6,469,808 | B1 | 10/2002 | Onishi et al. |
| 6,486,974 | B1 | 11/2002 | Nakai et al. |
| 6,538,243 | B1 | 3/2003 | Bohn et al. |
| 6,567,543 | B1 | 5/2003 | Shiraiwa et al. |
| 6,724,503 | B1 | 4/2004 | Sako et al. |
| 6,791,721 | B1 | 9/2004 | Konogaya et al. |
| 6,892,945 | B2 | 5/2005 | Shishido |
| 7,042,598 | B2 | 5/2006 | Payne |
| 7,190,493 | B2 | 3/2007 | Maki et al. |
| 7,284,891 | B2 | 10/2007 | Saito et al. |
| 7,388,688 | B2 | 6/2008 | Yamazaki et al. |
| 7,538,911 | B2 | 5/2009 | Sakurai et al. |
| 7,593,143 | B2 | 9/2009 | Herloski |
| 7,722,223 | B2 | 5/2010 | Saito et al. |
| 7,760,403 | B2 | 7/2010 | Sakurai |
| 7,771,100 | B2 | 8/2010 | Yamamoto et al. |
| 7,796,310 | B2 | 9/2010 | Hasegawa et al. |
| 7,821,670 | B2 | 10/2010 | Nakaya et al. |
| 7,859,726 | B2 | 12/2010 | Endo et al. |
| 7,903,298 | B2 * | 3/2011 | Sawada et al. ............... 358/484 |
| 8,018,630 | B2 | 9/2011 | Herloski |
| 8,049,937 | B2 | 11/2011 | Saito |
| 8,228,567 | B2 | 7/2012 | Kim |
| 8,310,737 | B2 | 11/2012 | Nagao et al. |
| 8,385,736 | B2 | 2/2013 | Tsujimura et al. |
| 8,422,091 | B2 | 4/2013 | Yamaguchi |
| 8,467,108 | B2 | 6/2013 | Shimatani |
| 8,493,618 | B2 | 7/2013 | Ishii et al. |
| 8,643,915 | B2 | 2/2014 | Shimoda |
| 8,681,398 | B2 | 3/2014 | Shimoda et al. |
| 2002/0114152 | A1 | 8/2002 | Fujino et al. |
| 2005/0150956 | A1 | 7/2005 | Ikeda et al. |
| 2005/0195618 | A1 | 9/2005 | Uemura et al. |
| 2005/0206800 | A1 | 9/2005 | Wakisaka et al. |
| 2006/0008295 | A1 | 1/2006 | Kohchi et al. |
| 2006/0152942 | A1 | 7/2006 | Saito et al. |
| 2007/0252069 | A1 | 11/2007 | Oguchi |
| 2007/0268529 | A1 * | 11/2007 | Kuse ............................ 358/474 |
| 2007/0285740 | A1 | 12/2007 | Onishi et al. |
| 2008/0068682 | A1 | 3/2008 | Morikawa |
| 2008/0112017 | A1 | 5/2008 | Nagasaka |
| 2009/0003000 | A1 | 1/2009 | Saito et al. |
| 2009/0027743 | A1 | 1/2009 | Han |
| 2009/0034030 | A1 * | 2/2009 | Nagatani et al. ............. 358/509 |
| 2009/0034297 | A1 * | 2/2009 | Tahk et al. ................... 362/634 |
| 2009/0080213 | A1 | 3/2009 | Onishi et al. |
| 2009/0127569 | A1 | 5/2009 | Sawada et al. |
| 2009/0218525 | A1 | 9/2009 | Ikeda et al. |
| 2009/0294630 | A1 | 12/2009 | Saito et al. |
| 2010/0046045 | A1 | 2/2010 | Nagao et al. |
| 2010/0231987 | A1 | 9/2010 | Takeuchi |
| 2012/0147442 | A1 | 6/2012 | Kiyota et al. |
| 2012/0154876 | A1 | 6/2012 | Shimoda |
| 2012/0154877 | A1 | 6/2012 | Kisara et al. |
| 2012/0162727 | A1 | 6/2012 | Shimoda et al. |
| 2012/0287484 | A1 | 11/2012 | Shimoda |
| 2013/0009037 | A1 | 1/2013 | Takahashi |
| 2013/0038912 | A1 | 2/2013 | Horiguchi et al. |
| 2013/0038913 | A1 | 2/2013 | Shimoda et al. |
| 2013/0038914 | A1 | 2/2013 | Yoshida et al. |
| 2013/0181311 | A1 | 7/2013 | Sugiyama |
| 2013/0265617 | A1 | 10/2013 | Murakami et al. |

FOREIGN PATENT DOCUMENTS

| | | |
|---|---|---|
| EP | 0 252 709 A2 | 1/1988 |
| EP | 0 557 891 A1 | 9/1993 |
| EP | 0 844 784 A2 | 11/1997 |
| EP | 1 049 055 A2 | 4/2000 |
| EP | 1 049 055 A2 | 11/2000 |
| EP | 1 471 472 A2 | 4/2004 |
| EP | 1 835 469 A2 | 9/2007 |
| EP | 2 246 825 A1 | 4/2009 |
| EP | 2 134 071 A2 | 12/2009 |
| FR | 2 655 799 A1 | 6/1991 |
| JP | 04-150454 | 5/1992 |
| JP | 8-223417 A | 8/1996 |
| JP | 09-214675 A | 8/1997 |
| JP | 10-285330 A | 10/1998 |
| JP | 11-75015 A | 3/1999 |
| JP | 11-084544 | 3/1999 |
| JP | 2000-324308 | 11/2000 |
| JP | 2001-005122 A | 1/2001 |
| JP | 2001-223852 | 8/2001 |
| JP | 2001-272677 | 10/2001 |
| JP | 2003-037717 A | 2/2003 |
| JP | 2003-046726 A | 2/2003 |
| JP | 2003-281913 A | 10/2003 |
| JP | 2004-146870 A | 5/2004 |
| JP | 2005-198106 A | 7/2005 |
| JP | 2005-223424 A | 8/2005 |
| JP | 2006-311232 A | 11/2006 |
| JP | 3885088 B2 | 11/2006 |
| JP | 2007-116590 A | 5/2007 |
| JP | 2007-194797 A | 8/2007 |
| JP | 2007-300536 A | 11/2007 |
| JP | 2008-042425 | 2/2008 |
| JP | 2008-42425 A | 2/2008 |
| JP | 2008-112301 A | 5/2008 |
| JP | 2008124788 A | 5/2008 |
| JP | 2009-053316 A | 3/2009 |
| JP | 2009-086488 A | 4/2009 |
| JP | 2010-136061 A | 6/2010 |
| JP | 2010213039 A | 9/2010 |
| JP | 2011-124741 A | 6/2011 |
| WO | 97/23991 | 7/1997 |
| WO | 2006/137263 A1 | 12/2006 |
| WO | 2007/077760 A1 | 7/2007 |
| WO | 2008/013234 A1 | 1/2008 |

OTHER PUBLICATIONS

Office Action issued in Chinese Application No. 201110431991.5 dated Jan. 3, 2014. Cited in pending U.S. Appl. No. 13/333,751.
Japanese Office Action issued in application No. JP2012-163536, dated Sep. 17, 2013. Cited in related U.S. Appl. No. 13/570,970.
International Search Report for PCT/JP2010/069500 Mail date Nov. 30, 2010.
Extended European Search Report for EP 11194502.8, mail date Dec. 4, 2012. Cited related co-pending U.S. Appl. No. 13/328,553.
Japanese Office Action for JP 2011-236415, mail date Nov. 13, 2012. Cited related co-pending U.S. Appl. No. 13/328,553.
Japanese Office Action for JP 2010-282128, dated Nov. 6, 2012. Cited in related co-pending U.S. Appl. No. 13/328,553.
Japanese Office Action for JP 2012-247653, mail date Dec. 11, 2012. Cited in related co-pending U.S. Appl. No. 13/328,553.
Extended European search report issued in corresponding European Patent Application No. 12179608.0 dated Nov. 21, 2012. Cited related co-pending U.S. Appl. No. 13/570,645.

(56) References Cited

OTHER PUBLICATIONS

Korean Office Action issued in KR10-2012-49430, dated Jun. 27, 2013. Cited in related U.S. Appl. No. 13/467,357.
European Office Action issued in EP12167240.6, dated May 17, 2013. Cited in related U.S. Appl. No. 13/467,357.
Japanese Office Action issued in JP2010-293227, dated Dec. 11, 2012. Cited in related U.S. Appl. No. 13/338,418.
Japanese Office Action issued in JP2012-087401, dated Apr. 30, 2013. Cited in related U.S. Appl. No. 13/467,357.
Taiwanese Office Action cited in Taiwanese counterpart application No. TW99138186, dated May 27, 2014.
Office Action issued in U.S. Appl. No. 14/510,549, mailed on Jan. 30, 2015.
European Search Report issued in European counterpart application No. EP10840821.2, dated Jun. 26, 2015.

* cited by examiner

CONTACT IMAGE SENSOR UNIT INCLUDING A DETACHABLE LIGHT GUIDE SUPPORTING MEMBER AND IMAGE READING APPARATUS USING THE SAME

CROSS-REFERENCE TO RELATED APPLICATIONS

This application is a National Stage application of, and claims priority from, PCT Application No. PCT/JP2010/069500, filed on Nov. 2, 2010.

TECHNICAL FIELD

The present invention relates to a contact image sensor unit and an image reading apparatus suitable for an image scanner, facsimile, copying machine and so on. In particular, the present invention relates to a contact image sensor unit including an illumination device composed of a light source and a rod-like light guide for illuminating an original surface, and an image reading apparatus using it.

BACKGROUND ART

In the image reading apparatus such as an image scanner, copying machine and so on, a contact image sensor unit which is brought into close contact with the original to read the original at the same magnification has been conventionally used as the image sensor optically reading image information on the original and converting the information into electric signals.

The contact image sensor unit is used while being attached below a transparent original supporting body supporting the original in the image reading apparatus. There are two main methods of attaching the contact image sensor unit in the image reading apparatus as follows.

(1) A flatbed-type in which reading is performed by moving the image sensor unit with the original fixed on the original supporting body of the image reading apparatus.

(2) A sheetfeed-type in which reading is performed by moving the original on the original supporting body with the image sensor unit fixed to the image reading apparatus.

These examples are disclosed in Patent Literature 1.

It is known that in a configuration example of the conventional contact image sensor unit used for them, an illumination device composed of a light source using an LED for illuminating the original and a light guide is attached to a frame. This illumination device is composed of a light guide which takes in emitted light from the light source and emits the light so that the illumination amount becomes almost uniform over the length of one line of an original reading part. Further, the frame also includes a sensor substrate on which a sensor array formed by arranging a plurality of photoelectric conversion elements including a plurality of light receiving parts performing photoelectric conversion of an optical image of the original into electric signals in lines is mounted, and a lens array forming an optical image of the original on the sensor array. Further, a connector electrically connecting the sensor array to an external device is attached to the sensor substrate.

The conventional contact image sensor unit is attached below a transparent glass being the original supporting body in the above-described type (1). On the other hand, a transparent glass being the original supporting body is attached on the contact image sensor unit in the above-described type (2).

Here, when the light guide is fixed to the frame of the contact image sensor unit with an adhesive or the like, there are following problems. Specifically, the materials of the frame and the light guide are different, thus possibly causing poor conditions such as the deformation of the light guide caused by the thermal expansion and/or contraction due to a change in environmental temperature, and the warpage of the contact image sensor unit and the like.

In Patent Literature 2, to cope with the thermal expansion difference and thermal contraction difference generated between the frame and the light guide constituting the illumination device, an image sensor as illustrated in FIG. 14 is proposed. An image sensor (a contact image sensor unit) 400 illustrated in FIG. 14 irradiates an original with light from a line illumination device to image reflection light from the irradiated original on a light receiving element array (photoelectric conversion element) 402 by a lens array (imaging element) 401 and then reads the image. Further, the line illumination device (illumination device) is composed of a light emitting element (light source) and a light guide 403. The light guide 403 is structured to be pressed against a frame 406 by a claw part 405 provided at the tip of an elastic holding part 404. Therefore, even when there is a thermal expansion difference or thermal contraction difference between the line illumination device and the frame 406, there is no stress occurring between them, resulting in no poor condition such as warpage or the like on the image sensor 400. Further, it is also disclosed that since the line illumination device is fixed to the frame 406 of the image sensor 400 by the elastic holding part 404, the line illumination device can be easily detached.

However, in this conventional technique, it is difficult to integrally mold the frame 406 and the elastic holding part 404 which needs to be made of a material having elastic characteristics different from that of the frame 406 and have a complicated shape in consideration of the shape and the detachability of the light guide 403 and the like.

Furthermore, there is a problem in terms of production management of the contact image sensor unit production as follows.

There is a demand to make the outside dimensions of frames uniform in order to commonalize the assembly work and related peripheral components. However, there are variations in the specifications, shape, attachment position, direction of emitted light and so on of the light guide used in the contact image sensor unit. For example, is necessary to prepare light guides in various shapes to cope with the illumination angle or direction due to the difference in distance between the contact image sensor and the original, and to cope with various modifications in the attachment position and angle of the light guide to the frame.

Accordingly, in the production of the contact image sensor unit, it is necessary to prepare many kinds of individual frames to cope with the difference in shape, attachment position and angle of the light guide, requiring labor in production management. Further, FIG. 12 of the above-described Patent Literature 2 discloses a CIS unit in which two line illumination devices are arranged to be substantially symmetric about a lens array located at the middle. The two structures of the light guides and the cases housing the light guides used in the line illumination devices are the same. Further, in Patent Literature 1, the two right and left light guides are configured to be different in irradiation angle and position to the lens array at the middle in order to increase the illumination depth, thereby increasing the quality of the image sensor unit in terms of the illumination depth and the illumination amount to the original.

CITATION LIST

Patent Literature
Patent Literature 1: Japanese Patent Publication No. 3885088
Patent Literature 2: International Publication Pamphlet No. WO 2006/137263

SUMMARY OF INVENTION

Technical Problem

The present invention improves the quality by preventing the warpage in the above-described conventional contact CIS unit, the deformation of the light guide and so on. Further, an object is to provide a contact image sensor unit capable of making the production management more efficient by realizing easy moldability and reduction in kinds of the frame, and an image reading apparatus using it.

Solution to Problem

A contact image sensor unit of the present invention includes: a light source illuminating an original; a rod-like light guide guiding light from the light source to the original; an imaging element forming reflected light from the original on a plurality of photoelectric conversion elements; a sensor substrate on which the plurality of photoelectric conversion elements are mounted; a frame to which the light source, the light guide, the imaging element, and the sensor substrate are attached and which has a positioning part for attaching the light guide thereto; and a supporting member which attachably/detachably and slidably supports the light guide and is attachably/detachably attached to the positioning part.

Further, the supporting member attachably/detachably and slidably supports a portion in a longitudinal direction of the light guide.

Further, the supporting member supports the light guide with the light guide separated from the frame when viewing a portion of the supporting member supporting the light guide in a main-scan direction.

Further, the supporting member is provided with a light guide receiving part and an arm which are coupled to each other via a coupling part, and the light guide receiving part and the arm grip the light guide.

Further, the arm has an elastic force in a direction in which the arm grips the light guide.

Further, the light guide receiving part and the arm are provided at positions facing each other when viewed in a main-scan direction, and the light guide receiving part is provided on either side in the main-scan direction across the arm.

Further, the supporting member is provided with an elastically deformable pressing part coupling to the coupling part, and the pressing part is elastically deformed by a cover glass attached to the frame to press the supporting member in a direction of a bottom surface of the positioning part.

Further, the pressing part is provided with a pressing part body coupling to the coupling part and a hook part formed in an almost hook shape starting from the pressing part body.

Further, the pressing part is provided with a projection projecting upward, and a top portion of the projection is located at a height projecting from an upper surface of the frame in a state that the supporting member is attached to the positioning part.

Further, the supporting member is provided with an elastically deformable pressing part coupling to the coupling part, and the pressing part is elastically deformed by one inner wall of the positioning part to press the supporting member in a direction of another inner wall of the positioning part.

Further, the supporting member is provided with a locking claw, the positioning part is provided with a locking projection which locks the locking claw, and the supporting member is attached to the positioning part by locking the locking claw to the locking projection by snap-fit.

Further, the supporting member is provided with a light guide receiving part and an arm which are coupled to each other via a coupling part, the light guide receiving part is provided on either side in a main-scan direction across the arm, the locking claw is provided between the two light guide receiving parts, and the locking projection is formed to have a length in the main-scan direction having a dimension between the two light guide receiving parts and is locked with the locking claw to position the supporting member in the main-scan direction.

Further, the positioning part is provided with a positioning projection in abutment with the positioning member to position the supporting member in a main-scan direction.

Further, the positioning part has a bottom surface and an inner wall formed adjacent to the bottom surface, and a width dimension of the bottom surface and a height dimension of the inner wall are formed to be almost the same when viewing the positioning part in a main-scan direction.

Further, two sets of the light source and the light guide are provided, the positioning part corresponding to the light guide in each of the sets is provided, and sectional shapes of the two positioning parts are formed different to be distinguishable when viewed in a main-scan direction.

Further, the positioning part is provided with a locking groove to which the supporting member is attached.

Further, the supporting member is provided with a locking claw, the locking groove is provided with a locking projection which locks the locking claw, and the supporting member is attached to the locking groove by locking the locking claw to the locking projection by snap-fit.

Further, the supporting member is formed of a synthetic resin with a self-lubricating property.

Further, the supporting member is formed of a synthetic resin containing a solid lubricant.

Further, one supporting member supports one light guide.

Further, a plurality of the supporting members support one light guide.

Further, the light guide is provided with a fixing in supporting the frame, near an end face on the light source side.

Further, an image reading apparatus of the present invention uses a contact image sensor unit, the contact image sensor unit including: a light source illuminating an original; a rod-like light guide guiding light from the light source to the original; an imaging element forming reflected light from the original on a plurality of photoelectric conversion elements; a sensor substrate on which the plurality of photoelectric conversion elements are mounted; a frame to which the light source, the light guide, the imaging element, and the sensor substrate are attached and which has a positioning part for attaching the light guide thereto; and a supporting member which attachably/detachably and slidably supports the light guide and is attachably/detachably attached to the positioning part.

Advantageous Effects of Invention

According to the present invention, since a light guide can be attached to a frame without using an adhesive by providing a supporting member attachably/detachably supporting the light guide and attachably/detachably attached to a positioning part, the deformation of the light guide, the warpage of the contact image sensor unit and so on can be prevented to improve the quality. Further, the shape of the supporting member can be modified according to the shape of the light guide, so that the frame can be easily molded and the kinds of the frame can be reduced, thus making the production management more efficient.

DESCRIPTION OF EMBODIMENTS

Hereinafter, this embodiment is made by applying the present invention to a contact image sensor unit (hereinafter, referred to as a CIS unit) and an image reading apparatus using it. In this embodiment, when attached to a frame, a light guide is attached to the frame using a supporting member supporting the light guide. In particular, it is also effective in the case of using this embodiment in a CIS unit including two illumination devices provided on both sides across a rod-lens array. Hereinafter, this embodiment will be described in detail using drawings. Note that the same numerals are given to components common in embodiments 1 and 2 and repeated description will be omitted.

Embodiment 1

Figure 1:
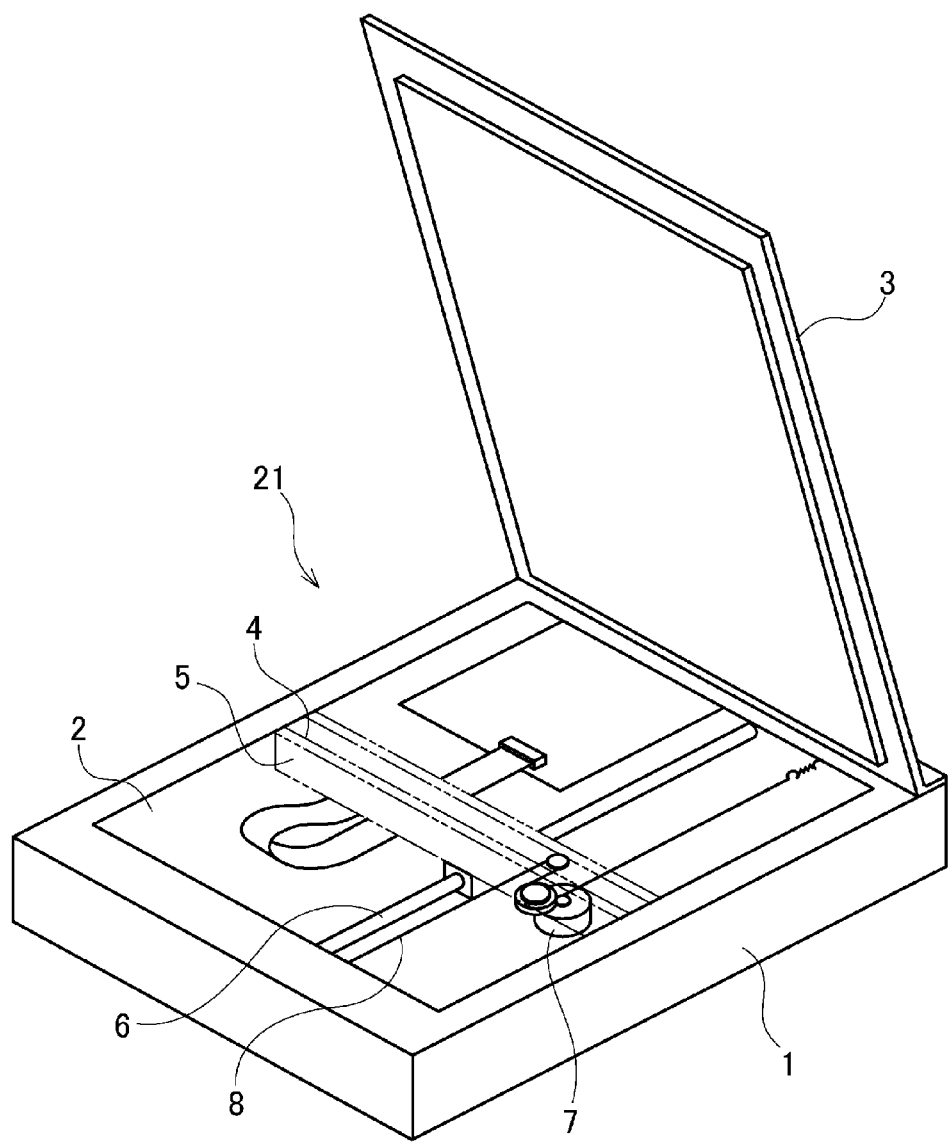
FIG. 1 is a perspective view illustrating an example of the structure of a flatbed-type image reading apparatus to which the present invention is applicable.

FIG. 1 is a perspective view illustrating the structure of a flatbed-type scanner (image reading apparatus) to which the present invention is applicable.

A numeral 1 denotes a casing. The casing 1 is provided with a platen glass 2 composed of a transparent plate made of glass as an original placing part, and a platen cover 3 provided to freely open and close in a manner to cover the original placed on the platen glass 2.

Further, inside the casing 1, a CIS unit 4 to which the present invention is applicable is stored. A numeral 5 denotes a holding member holding the CIS unit 4 in a manner to surround it. A numeral 6 denotes a slide shaft provided to be capable of moving the holding member 5 along the platen glass 2. A numeral 7 denotes a drive motor. A numeral 8 denotes a wire.

With this configuration, the drive motor 7 is driven to mechanically move the wire 8 attached to the holding member 5 to thereby move the CIS unit 4 in a reading direction (sub-scan direction) along the slide shaft 6.

Figure 2:
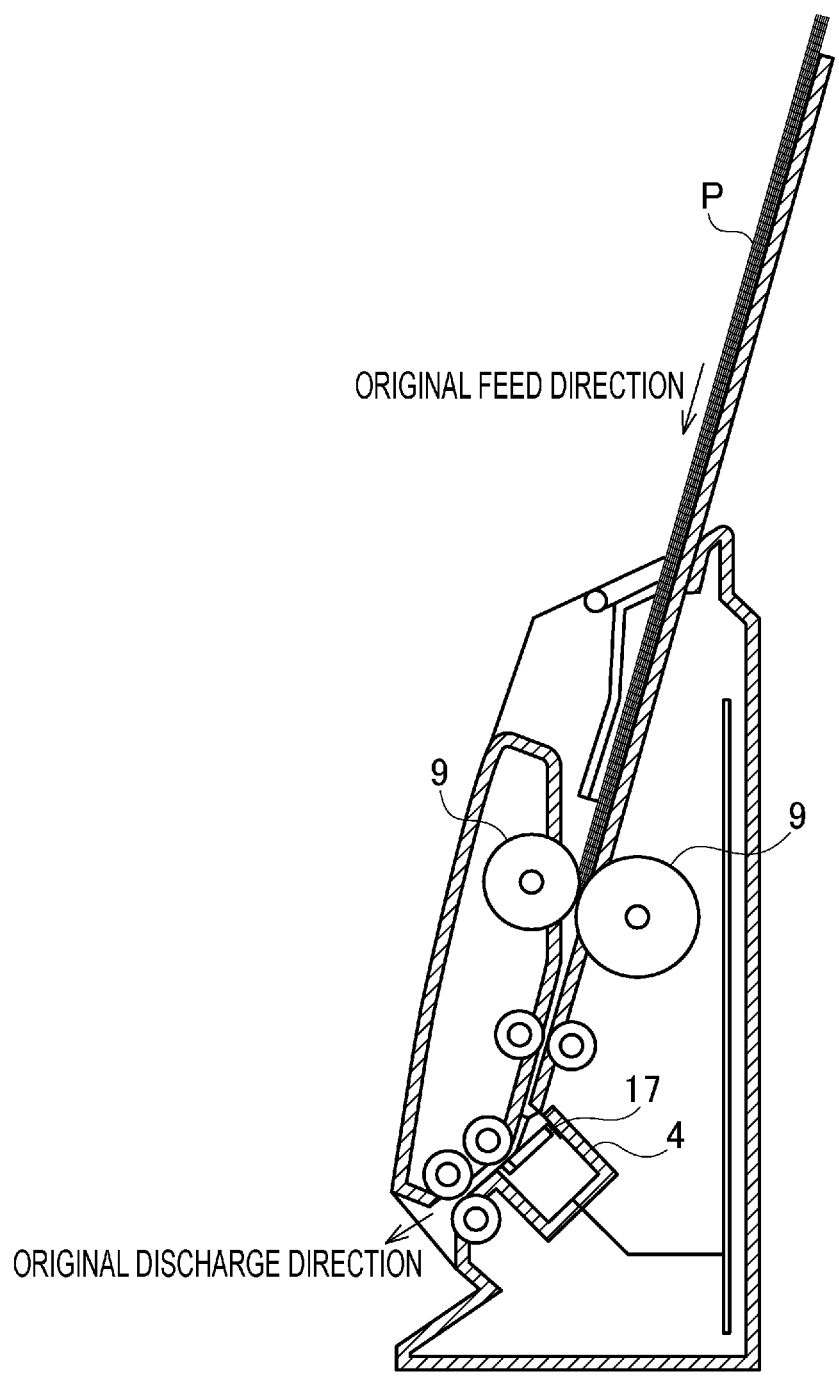
FIG. 2 is a sectional view in a sub-scan direction illustrating an example of the structure of a sheetfeed-type image reading apparatus to which the present invention is applicable.
Figure 3:
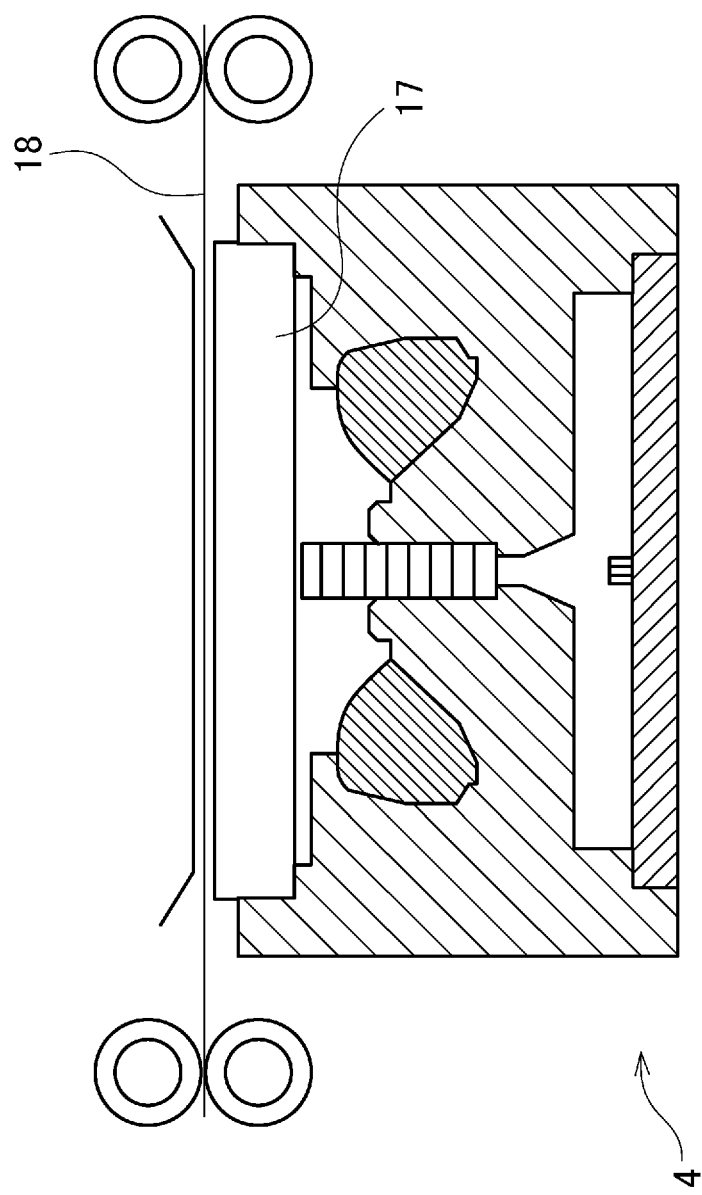
FIG. 3 is an enlarged schematic view of an example of a part of a contact image sensor unit 4 attached in FIG. 2.

FIG. 2 is a sectional view in the sub-scan direction illustrating the structure of a sheetfeed-type scanner (image reading apparatus) to which the present invention is applicable. More specifically, numerals 9 denote original conveying rollers so that the original is conveyed while sandwiched between the original conveying rollers 9. Further, a cover glass 17 is provided on the upper surface on the original side of the CIS unit 4. FIG. 3 is an enlarged schematic view of a part of the CIS unit 4 illustrated in FIG. 2.

FIG. 1 and FIG. 2 illustrate the image reading apparatuses using the CIS units to which the present invention is applicable, and the scope of the present invention is not limited to these types of image reading apparatuses.

Figure 4:
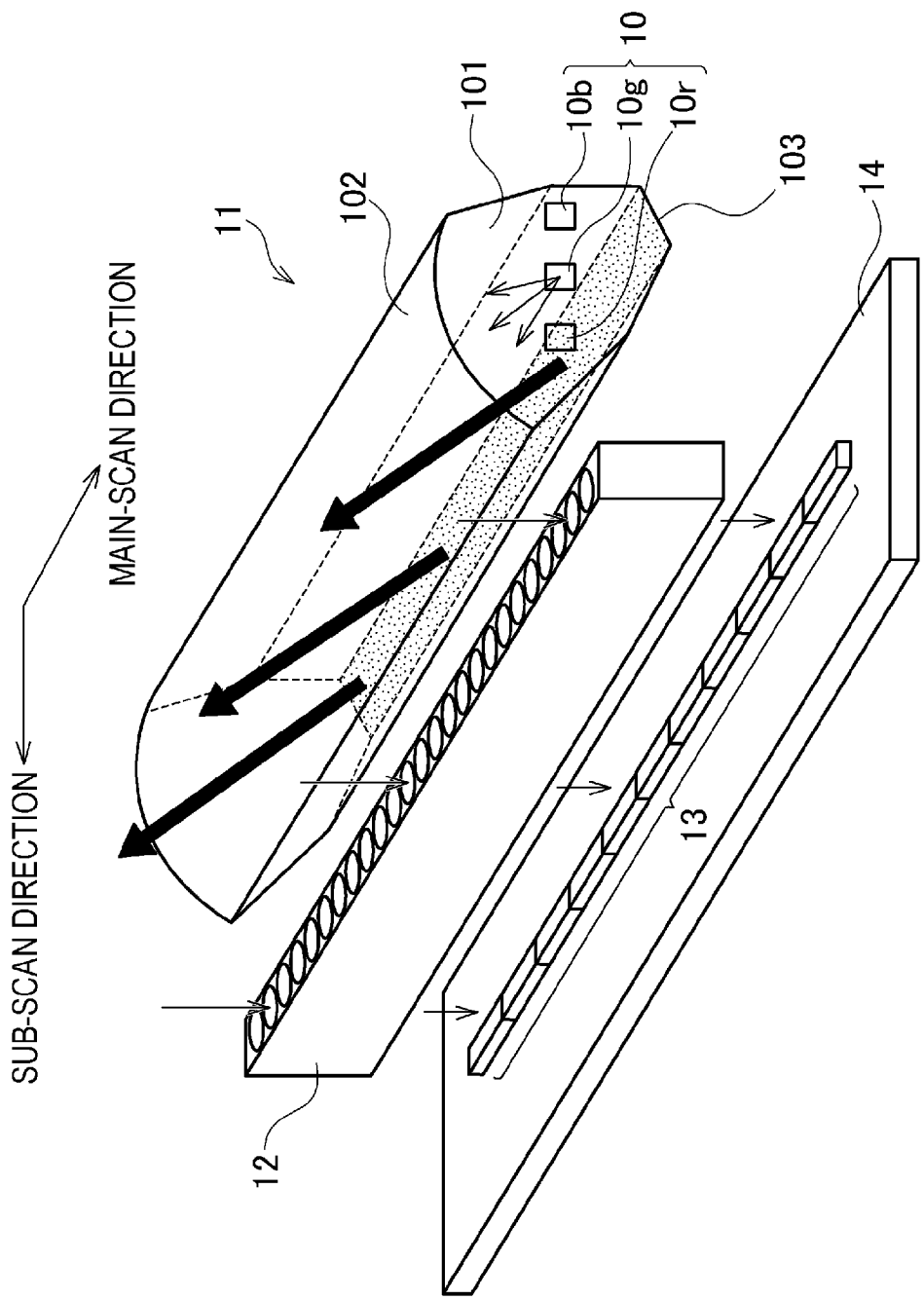
FIG. 4 is a schematic view for explaining an example of the relation between optical components and a light path inside the contact image sensor unit 4 to which the present invention is applicable.

FIG. 4 is a schematic view for explaining the relation between optical components and the light path from a light source inside the CIS unit 4. FIG. 4 illustrates an example in which an illumination device is composed of a set of a light source 10 and a light guide 11 for simplification of illustration.

A numeral 10 denotes an example of the light source for illuminating an original. In the light source 10, light emitting elements 10r, 10g, 10b composed of LEDs having emission wavelengths of at least three colors of red, green, blue (hereinafter, abbreviated as RGB). The light source 10 is configured to radiate light by turning on the light emitting elements 10r, 10g, 10b in sequence. As the light emitting elements 10r, 10g, 10b, LED elements emitting light of red, green, blue colors respectively.

A numeral 11 denotes a light guide guiding the light radiated from the light source 10 to the original (not illustrated). On an end face in the longitudinal direction of the light guide 11, the light source 10 is placed. The light source 10 and the light guide 11 in combination function as the illumination device.

A numeral 12 denotes a rod-lens array as an imaging element. The rod-lens array 12 is made by arranging a plurality of lens elements of an erect equal magnification imaging type and forms the reflected light from the original on a plurality of photoelectric conversion elements 13. Further, a micro-lens array can also be used as a coupling an imaging element of the present invention.

The numeral 13 denotes the plurality of photoelectric conversion elements converting the reflected light (original image) formed by the rod-lens array 12 into an electric signal. The number of photoelectric conversion elements 13, enough to deal with the width of the original to be read, are arranged. A numeral 14 denotes a sensor substrate on which the arranged plurality of photoelectric conversion elements 13 are mounted.

The above configuration is an example of the configuration of the optical components of the CIS unit 4 to which the present invention, installable on any of the flatbed-type and sheetfeed-type image reading apparatuses, is applied. These optical components are attached to the frame, being a structural member, and assembled as the CIS unit.

As the light guide 11, a light guide molded of transparent plastic such as an acrylic resin or polycarbonate called an organic glass is used. The light guide 11 of this embodiment is molded of an acrylic resin.

A numeral 101 denotes an end face in the longitudinal direction (main-scan direction) of the light guide 11 and a light entering surface which the light from the light source 10 enters. The light source 10 is placed to face the light entering surface 101 so that the light can efficiently enter the light guide 11.

A numeral 102 is a surface formed along the longitudinal direction of the light guide 11 and to face the original, and is an emission surface from which the light is emitted. The emission surface 102 mainly emits the light scattered by a reflection surface 103 provided to face the emission surface 102 to illuminate the original.

Figure 5:
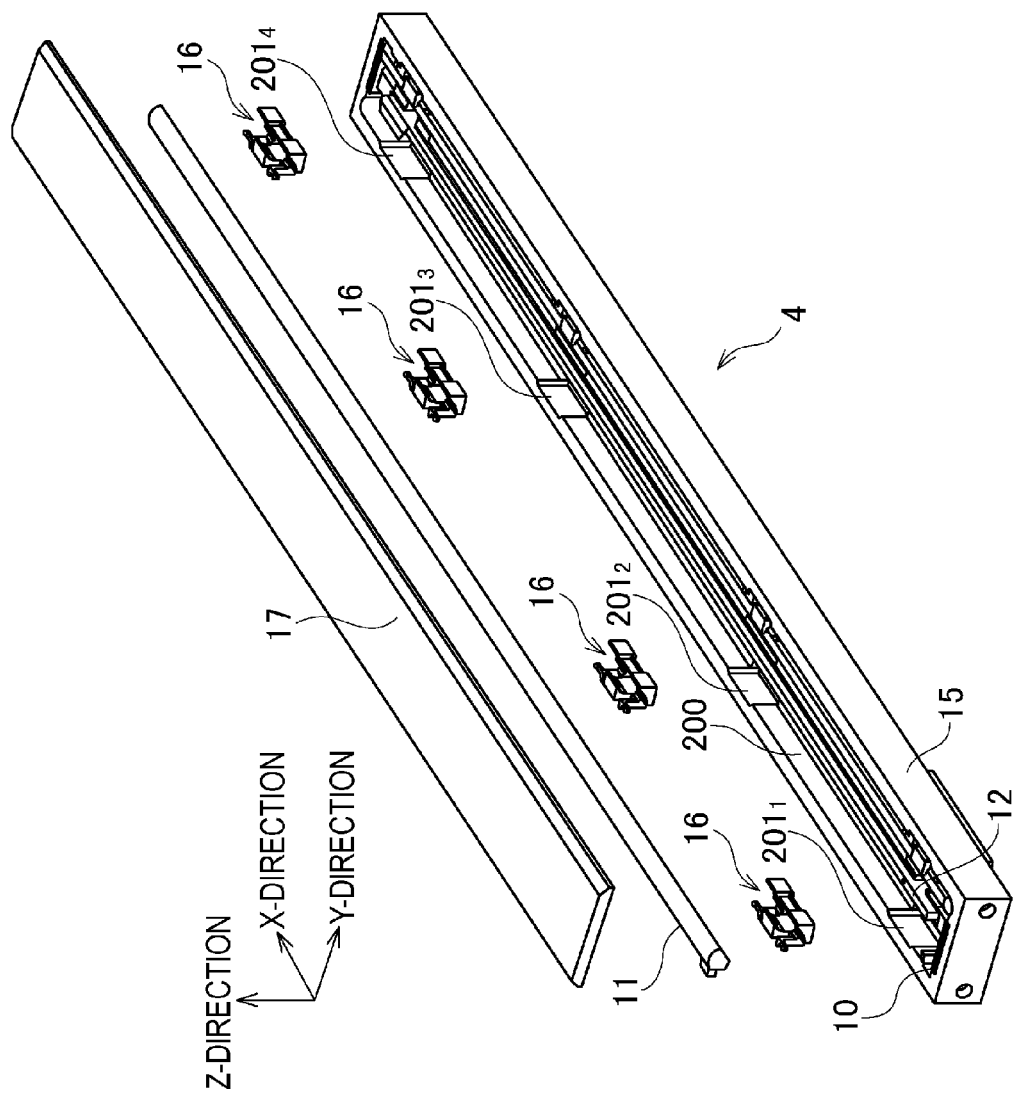
FIG. 5 is a perspective view illustrating an example of the structure of the contact image sensor unit 4 to which the present invention is applicable.

Here, the CIS unit 4 of this embodiment will be described in detail. FIG. 5 is a perspective view illustrating the structure of the CIS unit 4 to which this embodiment is applicable, and FIG. 6 is a partially enlarged view of the CIS unit 4.

Figure 6:
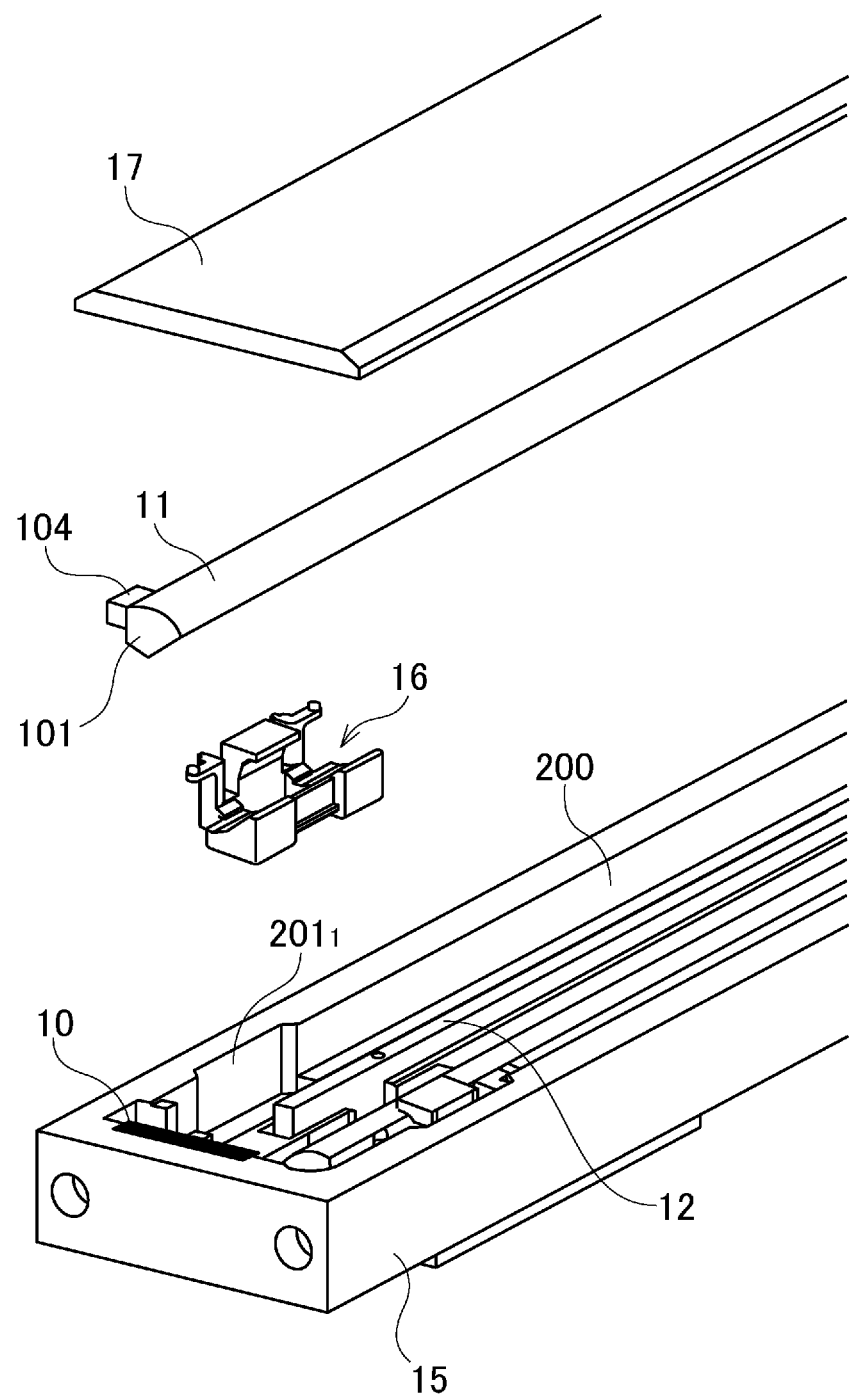
FIG. 6 is a partially enlarged view of the contact CIS unit 4 in FIG. 5.

Note that FIG. 5 and FIG. 6 include two sets of illumination devices each composed of the light source 10 and the light guide 11 but may include one set of illumination devices. Note that the definition that an X-direction illustrated by an arrow in FIG. 5 is the main-scan direction, a Y-direction is the sub-scan direction, a Z-direction is the upper direction, and a direction reverse to the Z-direction is the lower direction is used in the following description.

A numeral 15 denotes the frame on which the components of the CIS unit 4 are attached or supported. Inside the frame 15, the components such as the light source 10, the light guide 11, the rod-lens array 12, and the sensor substrate 14 on which the photoelectric conversion elements 13 are mounted are attached and supported in a predetermined positional relationship.

On the frame 15, a positioning part 200 housing the light guide 11 is provided as a light guide mounting part. At the positioning part 200, a plurality of locking grooves $201_l$ (l is a natural number from 1 to 4) are provided. The locking groove $201_l$ is formed to become deeper in a direction of the bottom surface of the positioning part 200 and in directions of the inner walls on both sides adjacent to the bottom surface.

Note that though the number of the locking grooves 201 is 4 in this embodiment, the number of the locking grooves 201 is not particularly limited. Further, the locking grooves 201 may be arranged such that the interval between them gradually increases from one end which light enters toward the other end (a middle portion when light enters both ends), for example, according to the distance from the light source 10.

Numerals 16 denote holders as supporting members supporting the light guide 11. The holders 16 are inserted between the light guide 11 and the locking grooves 201 provided in the frame 15 to attach and support the light guide 11 inside the positioning part 200 of the frame 15 while holding the light guide 11.

The holder 16 is formed of a synthetic resin with a self-lubricating property and is formed of, for example, super-high molecular weight polyethylene, polyacetal, polyamide, polybutylene terephthalate or the like. Alternatively, the holder 16 is formed of a synthetic resin containing a solid lubricant, and is formed of, for example, a synthetic resin coated with fluorocarbon resin, molybdenum disulfide or the like.

The self-lubricating property here means that the material itself has the friction coefficient at same degree as (or lower than) that of the solid lubricant such as molybdenum disulfide or the like and thereby can reduce the friction and abrasion without using another lubricant.

In this embodiment, the frame 15 is formed of a polycarbonate resin and the holder 16 is formed of a material of super-high molecular weight polyethylene.

A numeral 17 denotes a cover glass attached to the upper portion of the CIS unit 4 on the side facing the original. The original to be read is pressed against the surface of the cover glass 17. The cover glass 17 is, of course, a cover for protecting the inside of the frame 15 from entrance of dust thereinto. The CIS unit 4 having the cover glass 17 assembled in advance is mainly used as the sheetfeed-type image reading apparatus. On the other hand, the flatbed-type CIS unit 4 does not need to include the cover glass 17 because it is located behind the platen glass 2, on which the original is placed, included in the image reading apparatus.

Note that the material of the cover glass 17 is not limited to glass but may be another transparent member having the similar strength.

Figure 7:
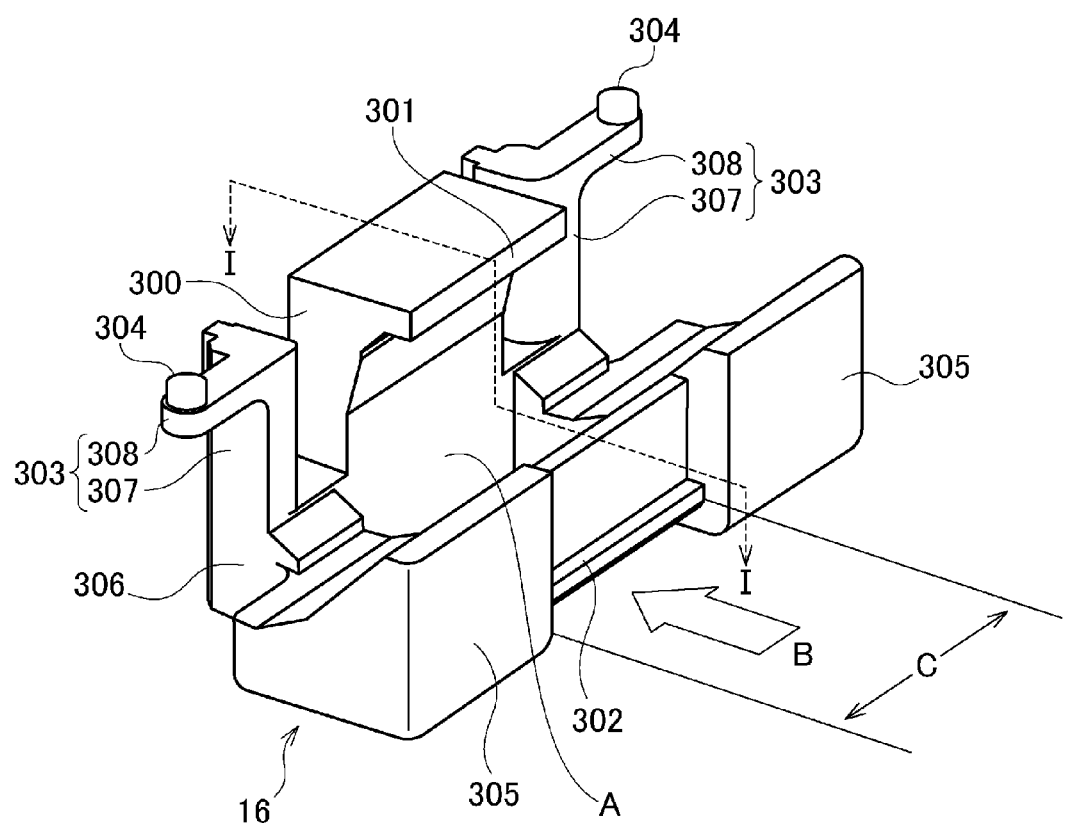
FIG. 7 is a perspective view illustrating an example of a holder 16 to which the present invention is applicable.

FIG. 7 is a perspective view illustrating the detailed shape of the holder 16.

A numeral 300 is an elastic arm provided on the holder 16. A numeral 301 denotes a bent portion provided at the tip of the arm 300. The bend portion 301 presses a part of the emission surface 102 of the light guide 11 in this embodiment. A numeral 305 denotes a light guide receiving part provided at the lower portion of the holder 16 and supports the light guide 11 from below. The arm 300 and the light guide receiving part 305 are structured to couple with each other via a coupling part 306 and form a fitting part A (see FIG. 8A) having an opening in an obliquely upward direction (a portion corresponding to the emission surface 102 of the light guide).

Further, the arm 300 is configured to have a certain level of elastic force to keep the fitting state when the light guide 11 is fitted in the fitting part A.

Figure 8A:
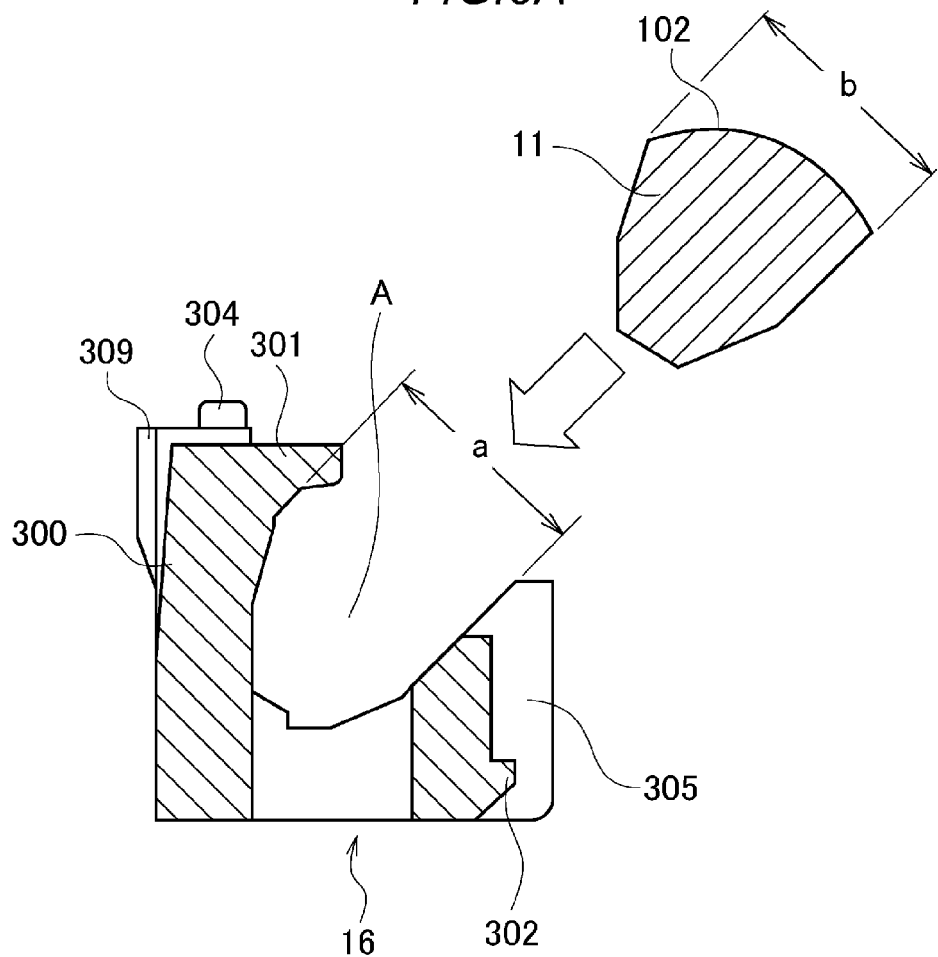
FIG. 8A is a sectional view in the sub-scan direction for explaining an example of a state that the holder 16 holds a light guide 11 to which the present invention is applicable.
Figure 8B:
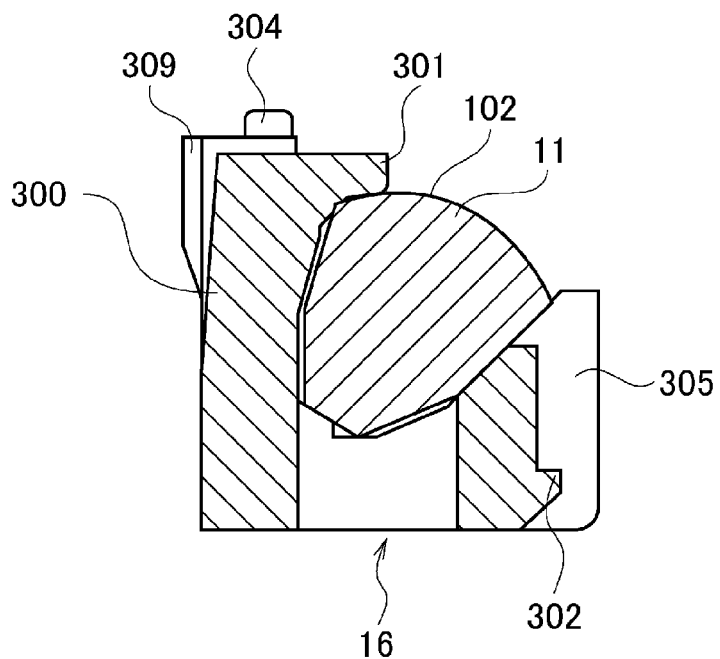
FIG. 8B is a sectional view in the sub-scan direction for explaining an example of a state that the holder 16 holds the light guide 11 to which the present invention is applicable.

With this configuration, the fitting part A has an inner surface curved inward and has an inner size formed smaller than the outer shape of the light guide 11 so that the arm 300 is elastically deformed upward to fit with the light guide 11 in a manner to hold it (see FIG. 8A and FIG. 8B). FIG. 8A and FIG. 8B are views obtained by cutting along a line I-I illustrated in FIG. 7. FIG. 8A illustrates the state before the light guide 11 is fitted into the fitting part A. FIG. 8B illustrates the state that the light guide 11 is fitted into the fitting part A and gripped by the arm 300 and the light guide receiving part 305.

More specifically, FIG. 8A illustrates that an inner size "a" of the opening except the bent part 301 in the fitting part A into which the light guide 11 is fitted is smaller than an outer diameter "b" of the light guide 11, namely, "a"<"b". Therefore, the light guide 11 can be fixed by the elastic force caused by the shape of the arm 300 fitting with the outside shape of the light guide 11, thereby not only facilitating the attachment of the light guide 11 to the holder 16 but also the detachment of the light guide 11 from the holder 16. Further, the elastic force in the direction in which the arm 300 grips the light guide 11 can fix the light guide 11 while pressing the light guide 11 against the holder 16, thus eliminating clearance which is necessary in terms of design despite an attachable and detachable configuration, and improving the positioning accuracy.

Note that since the emission surface 102 is held by the bent part 301, the opening area of the emission surface 102 is reduced by a projected area of the bent part 301, resulting in a loss of the radiated light. Therefore, it is preferable that the projection area of the bent part 301 is smaller to be able to decrease the reduction in opening area of the emission surface 102.

Figure 9:
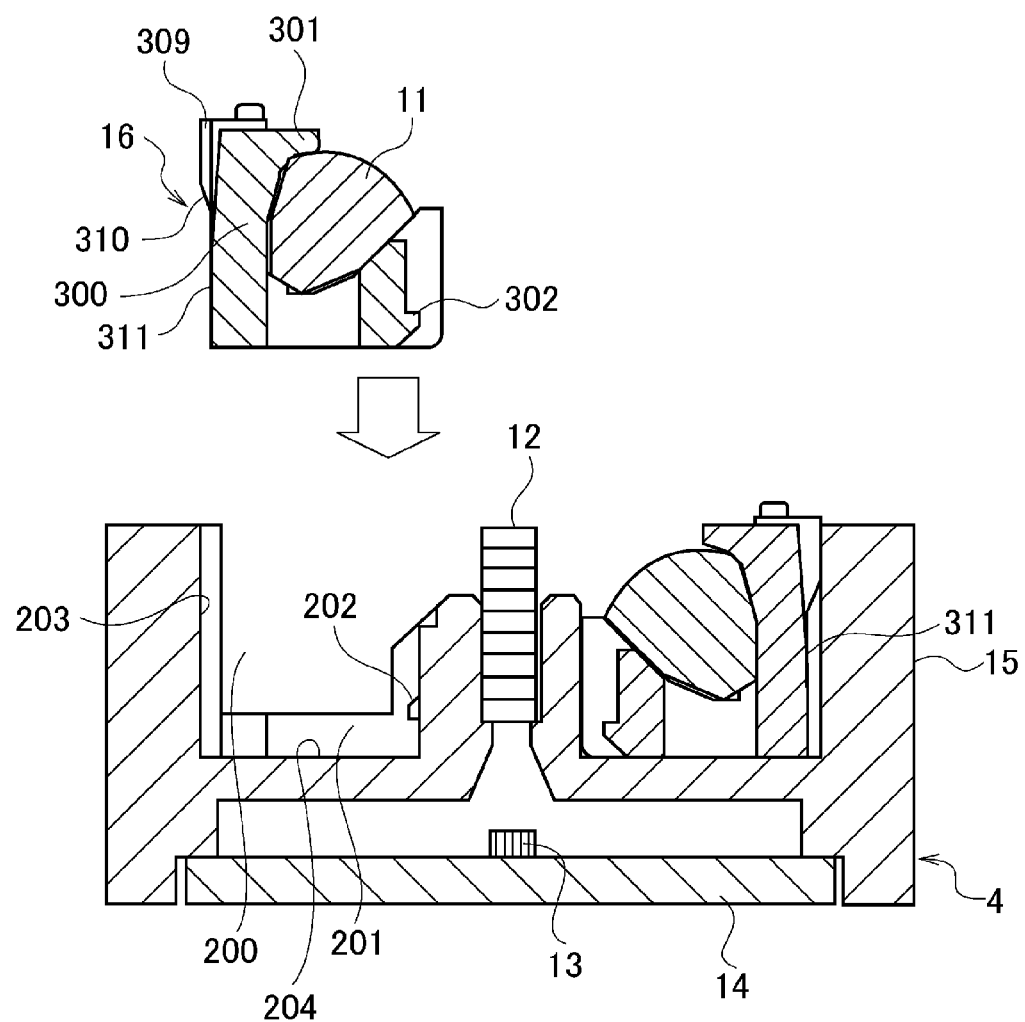
FIG. 9 is a sectional view in the sub-scan direction for explaining an example of the attachment state between a frame 15 and the holder 16 to which an embodiment 1 is applicable.

FIG. 9 is a sectional view in the sub-scan direction illustrating the relation between the frame 15 and the holder 16 attached thereto.

A numeral 202 denotes a locking projection in a snap-fit shape provided in the locking groove 201.

A numeral 302 denotes a locking claw in a snap-fit shape locking with the locking projection 202 and is provided at the lower portion of the holder 16. As described above, the locking claw 302 and the locking projection 202 are formed in a snap-fit shape (for example, in a shape in which one of parts is provided with a projection and the other part is provided with a projection, cutout, groove, hook shape or the like which are coupled with each other by elastic lock), thereby making it possible to attach and support the light guide 11 such that the light guide 11 is positioned at the positioning part 200 of the frame 15 to improve the positioning accuracy. In particular, the holder 16 has a space formed between the rear side of the locking claw 302 and the arm 300, so that when the locking claw 302 climbs over the locking projection 202, the locking claw 302 is elastically deformed to the space side. Accordingly, after the locking claw 302 climbs over the locking projection 202, the locking claw 302 returns to the original shape and is elastically locked with the locking projection 202.

Next, the invention relating to the attachment of the holder 16 to the positioning part 200 utilizing the cover glass 17 will be described. As illustrated in FIG. 7, pressing parts 303 shaped to be symmetrical about the arm 300 are provided on both sides in the main-scan direction of the holder 16 across the arm 300. The pressing part 303 includes a pressing part body 307 coupled with the arm 300 via a coupling part 306, and a hook part 308 formed in an almost hook shape starting from the pressing part body 307. The pressing part body 307 is standingly formed upward from the coupling part 306 and has a gap formed with respect to the arm 300. The hook part 308 is provided to project in the main-scan direction from the upper portion of the pressing part body 307. The two hook parts 308 across the arm 300 project in directions apart from each other. Further, as illustrated in FIG. 9, a bulging part 309 projecting outward is formed continuously from a tapered surface 310 above a surface facing an inner wall 203 of the locking groove 201 among side surfaces of the pressing part body 307. The bulging part 309 bulges to the outside from an outer wall 311 of the arm 300.

Figure 10A:
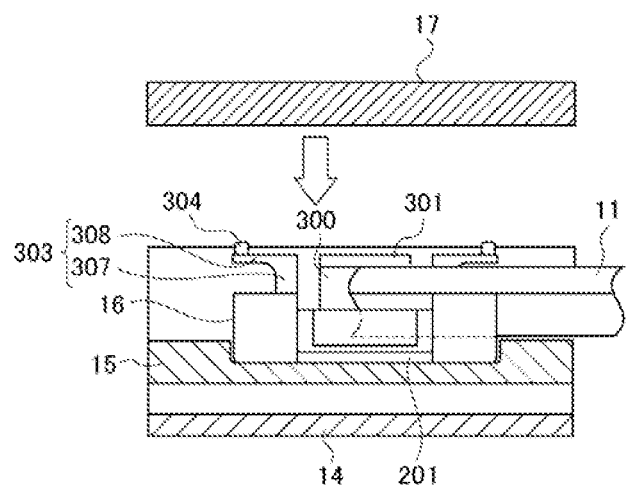
FIG. 10A is a sectional view in a main-scan direction for explaining an example of the relation between the frame 15, the holder 16 and a cover glass 17 to which the embodiment 1 is applicable.

At the top of the above-described hook parts 308, projections 304 are provided respectively. The height of the projection 304 is the height projecting from the upper surface of the frame 15 when the holder 16 is attached to the locking groove 201 (see FIG. 10A). FIG. 10A is a sectional view of the holder 16 and the frame 15 when the holder 16 illustrated in FIG. 7 is viewed from an arrow B direction.

Figure 10B:
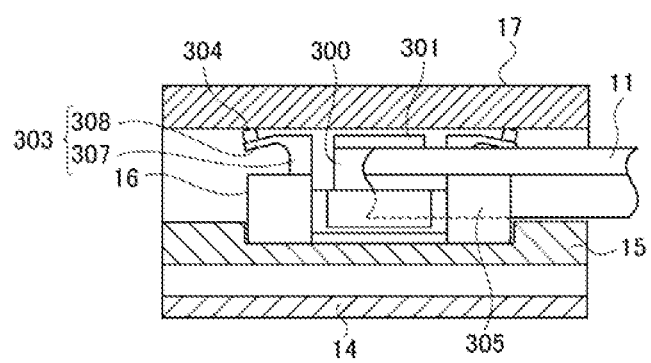
FIG. 10B is a sectional view in the main-scan direction for explaining an example of the relation between the frame 15, the holder 16 and the cover glass 17 to which an embodiment 1 is applicable.

With this configuration, when the cover glass 17 is attached to the frame 15, the projections 304 are pushed down by the rear surface of the cover glass 17, and the hook parts 308 of the right and left pressing parts 303 are accordingly pushed down while being elastically deformed. As a result of this, the elastic force due to the hook shapes of the pressing parts 303 cause a pressing force pressing the holder 16 downward, thereby making it possible to fix the holder 16 with the holder 16 pressed against a predetermined position of the frame 15. The holder 16 can be fixed more strongly as described above to thereby further increase the positioning accuracy (see FIG. 10B). FIG. 10B is a view illustrating the state that the cover glass 17 is attached after the state illustrated in FIG. 10A.

Further, in the state that the holder 16 is attached to the frame 15, the pressing part body 307 is pressed by the one inner wall 203 of the locking groove 201 via the bulging part 309 (see FIG. 9). As a result, a pressing force pressing the holder 16 toward another inner wall 205 side of the locking groove 201 is generated to make the locking claw 302 to be deeply locked with the locking projection 202, thereby enabling the holder 16 to strongly fix to the locking groove 201.

This allows the light guide 11 to be attached and supported on the positioning part 200 of the frame 15 by the holders 16 at a total of four positions which are both ends and two middle positions of the light guide 11.

Next, an example of a method of attaching and detaching the light guide 11 to/from one positioning part 200 in FIG. 9 will be described.

At the time when attaching the light guide 11 to the frame 15, the four holders 16 are first inserted into the corresponding locking grooves 201 and pushed down until the locking claws 302 are locked by the locking projections 202. Then, the light guide 11 is fitted with the fitting parts A of all of the four holders 16, whereby the light guide 11 is attached at a predetermined position. Lastly, the cover glass 17 is fixed to the frame 15. In this event, the projections 304 and the pressing parts 303 are pushed down by the rear surface of the cover glass 17, whereby all of the four holders 16 are pressed against a lower portion (the bottom surface) of the positioning member 200 by the elastic force of the pressing parts 303. This makes it possible to strongly fix the respective holders 16 at the predetermined positions of the locking grooves 201 of the frame 15. With this fixation, the attachment finishes.

For detaching the light guide 11 from the frame 15, the cover glass 17 is first removed. Then, the light guide 11 is detached from the fitting part A of each of the holders 16 while the arm 300 of the holder 16 is elastically deformed upward. Lastly, the holder 16 is pulled up while being inclined toward the rod-lens array 12 side, whereby the elastic lock (snap-fit) between the locking claw 302 and the locking projection 202 can be released to detach the holder 16. This operation is repeated for all of the holders 16 to finish the detachment. Though a set of the locking projection 202 and the locking claw 302 in combination for locking by the snap-fit is constituted for each holder 16 in this embodiment, a case where a plurality of sets of them are used to engage each holder 16 and the frame 15 also falls within the present invention.

This makes the holder 16 attachable and detachable to/from the frame 15 and the light guide 11. Since the attachment and detachment of the light guide 11 can be freely performed via the holder 16 and therefore eliminate the necessity to use an adhesive, the deformation of the light guide 11 and the warpage of the CIS unit 4 can be prevented. Further, for example, even if dust and the like enter during manufacture and after assembly of the CIS unit 4, correction work can be easily performed. Further, even when the shape of the light guide 11 is modified according to the usage situation, it becomes possible to exchange only the light guide 11 according to the usage without changing the shape of the frame 15, by preparing the holder 16 having a fitting part A conforming to the shape of the light guide 11.

In addition, since the light guide 11 can be fixed while pushed against the predetermined position of the frame 15 by the elastic force of the arm 300 provided on the holder 16, clearance which has been necessary in terms of design despite an attachable and detachable configuration becomes unnecessary so that the positioning accuracy can be increased.

Further, the pressing part 303 is pushed down by the rear surface of the cover glass 17, whereby the elastic force of the pressing part 303 can further strongly fix the holder 16 to the frame 15 (the locking groove 201) to further improve the positioning accuracy.

Furthermore, the holder 16 is formed of the synthetic resin having the self-lubricating property and fits the light guide 11 in the fitting part A, and thereby the light guide 11 can freely move in the main-scan direction to the holder 16. This makes it possible to reduce the flaw caused on the surface of the light guide 11 due to the deformation of the light guide 11 caused by the thermal expansion and/or contraction due to a change in environmental temperature, and due to the friction and the like at the time of attachment and detachment of the light guide 11.

Alternatively, the holder 16 is formed of the synthetic resin containing a solid lubricant, and thereby can reduce the flaw caused on the surface of the light guide 11 at the time of deformation and due to the friction and the like at the time of attachment and detachment of the light guide 11 at a low cost.

Further, the shapes of the holder 16 (the locking claw 302) and the locking groove 201 (the locking projection 202) may be of any shapes as long as they have locking means capable of locking with each other.

Further, the holder 16 may have a shape not only to fix the light guide 11 but also to be capable of selectively fixing a different light source such as an LED array substrate or the like. In this case, the holder 16 produces an effect of capable of selecting the light source according to the usage situation and/or freely combining the right and left light sources.

In the positioning part 200, the frame 15 and the LED array substrate may be shaped to be directly fixed with each other, for example, by a snap-fit shape so that the fixation of the LED array substrate not using the holder 16 and the fixation of the light guide 11 using the holder 16 can be selectively combined.

In this case, the snap-fit shape for fixing the LED array substrate provided on the positioning part 200 and the snap-fit shape for fixing the holder 16 may be made common. Thus, the fixation can be coped with by providing one kind of snap-fit shape in the positioning part 200, resulting in simplification of the structure of the frame 15.

Embodiment 2

This embodiment is the invention in which the locking grooves 201 are not formed in the positioning part 200 as in the embodiment 1, but a holder 16 as a supporting member gripping and supporting a light guide 11 is made attachably/detachably attached to a positioning part 500. Hereinafter, the details of the invention of the embodiment 2 will be described using FIG. 11 to FIG. 13 in addition to the drawings used for the description of the embodiment 1. The same components as those in the description of the embodiment 1 are made to correspond to them by giving the same numerals and symbols to the components. However, the frame and parts and elements directly related with the frame are characterized in that there is no locking groove therein, and are newly given numerals in the 500s. The light guide 11 and the light source 10 constituting the illumination device in the embodiment 1 can be used as they are. The basic function and the configuration of the holder 16 itself do not need to have special specifications as compared with the embodiment 1, and given the same numerals as those in the embodiment 1. As a matter of course, the dimensions are changed to match the inner size of the positioning part 500 in the embodiment 2 in order to directly attach them to the positioning part 500 having no locking groove.

Figure 11:
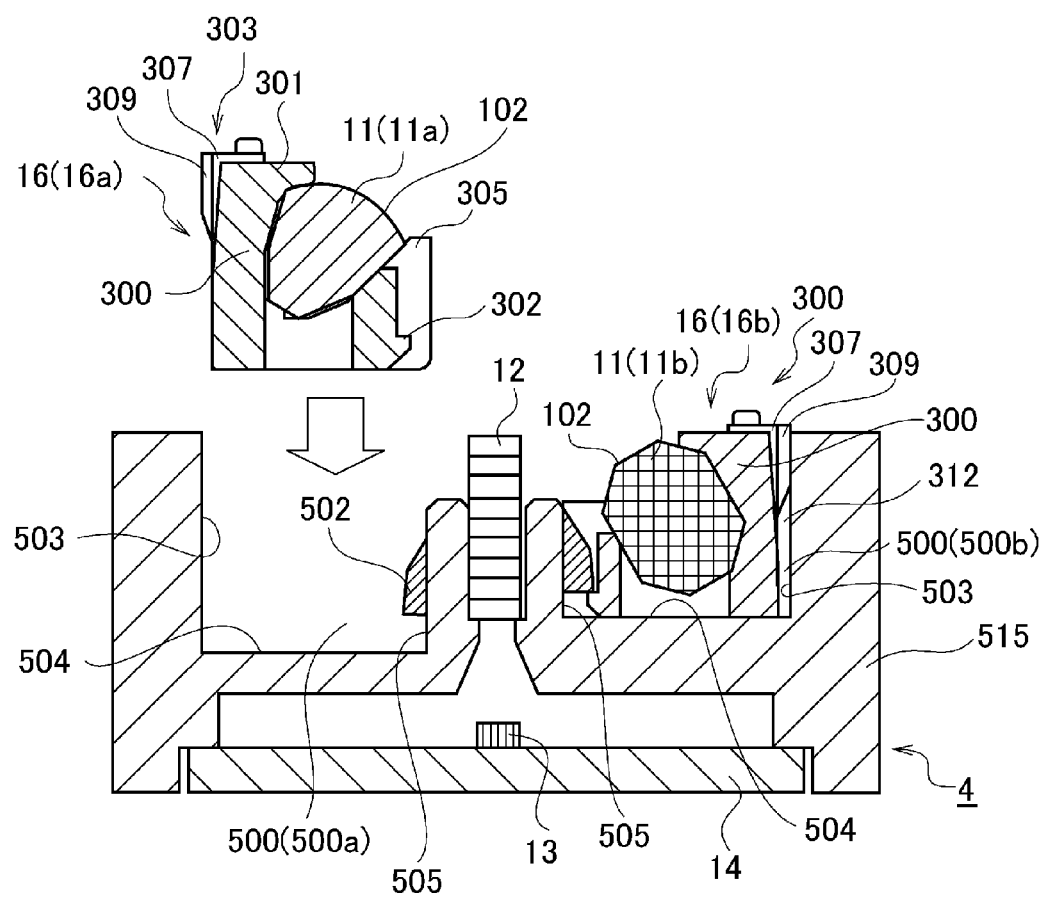
FIG. 11 is a sectional view in the sub-scan direction for explaining an example of the attachment state of a frame 515 and the holder 16 to which an embodiment 2 is applicable.

FIG. 11 is a schematic view explaining an example of a section in the sub-scan direction of a CIS unit 4 in the embodiment 2. The illustration of the holder 16 is the section cut along a line I-I illustrated in FIG. 7. The positioning part 500 for housing the light guide 11, provided in a frame 515, has a shape without the locking groove in the embodiment 1. Further, the height of an inner wall 503 being an inner surface of the positioning part 500 and the width (in the sub-scan direction) of a bottom surface 504 are formed to be identical in a region where the holder 16 can be attached or in a region corresponding to the length of the light guide 11. More specifically, the positioning part 500 being a portion where the light guide 11 is housed and attached is formed such that the height of the inner wall 503 and the width of the bottom surface 504 in the sectional shape in the sub-scan direction are substantially the same. Therefore, the positioning part 500 can be formed so that the outer shape of the holder 16 attached thereto sufficiently abuts against the inner wall 503 and the bottom surface 504. As a result of this, the holder 16 can be accurately attached to the inner wall 503 and the bottom surface 504 at any position of the positioning part 500 where the light guide 11 is housed. Incidentally, the support to a later-described positioning projection is described in an example 3.

FIG. 11 illustrates an attachment state of the holders 16 that grip the light guides 11 different in shape in two right and left positioning parts 500 which are arranged on right and left sides with a rod-lens array 12 intervening between them. Among the configurations and parts illustrated in FIG. 11, the numerals of those arranged on the left side are given a and the numerals of those arranged on the right side are given b.

The holder 16 is the same as that in the embodiment 1, and is structured such that the arm 300 pressing the light guide 11 from above and a light guide receiving part 305 supporting the light guide 11 from below couple with each other via a coupling part 306. The holder 16 supports the light guide 11 by it with the arm 300 and the light guide receiving part 305. Further, a bent part 301 provided at the tip of the arm 300 prevents the light guide in a sectional shape of a light guide 11a, 11b from getting off in the light emission direction. As a matter of course, the holder 16 is designed so that the area of a gripping margin for gripping the light guide 11 by the bent part 301 and the light guide receiving part 305, which is in abutment with the light emission surface 102, is minimized.

Further, as illustrated in FIG. 8A, the holder 16 is formed such that an inner size "a" of an annular shape surrounded by the arm 300 and the light guide receiving part 305 is slightly smaller than an outer diameter "b" of the light guide 11 as in the embodiment 1. Therefore, when gripping the light guide 11, the holder 16 can firmly grip the light guide 11 by the elastic force caused by the elastic deformation in a direction in which the arm 300 expands in this annular shape.

Further, as illustrated in FIG. 11, in the state that the holder 16 gripping the light guide 11*b* is attached in a positioning part 500*b*, a warpage gap 312 enabling the arm 300 to be sufficiently elastically deformed is secured between the positioning part 500 and the arm 300. Securing the warpage gap 312 between the positioning part 500 and the arm 300 as described above satisfactorily enables the work when fitting the light guide 11 into the holder 16.

In order to make the distribution of the emitted light amount uniform in the longitudinal direction, there are examples of the shape of the light guide 11 such as an example in which the light guide 11 is formed to be thinner according to the distance from the light source 10 or a light entering surface 101, and an example in which the width of a reflection surface 103 (in the sub-scan direction) is made wider or narrower in association with the distance from the light entering surface 101. The changes in dimension are continued along the longitudinal direction of the light guide 11. Accordingly, it is preferable to determine the dimension of the inner size "a" of the holder 16 illustrated in FIG. 8A to conform to the sectional shape (the outer diameter "b" illustrated in FIG. 8A) of the light guide 11 at a position where it is gripped by the holder 16 in the longitudinal direction for each light guide 11 to be used. However, if the above-described gripping force of the holder 16 due to the elastic deformation is within a range to sufficiently deal with the gripping, the dimension of the inner size of the holder 16 may be made the same inner size "a".

The gripping of the light guide 11 by the elastic force of the holder 16 can respond to the expansion and contraction of the light guide 11 due to the linear expansion difference caused by the environmental change. Concretely, the holder 16 grips the light guide 11 such that the side surface of the light guide 11 can slide on the annular inner surface of the holder 16. Accordingly, even if the light guide 11 expands or contracts along the longitudinal direction, the light guide 11 slides in the longitudinal direction inside the holder 16, and therefore the holder 16 and the frame 15 never receive the stress from the light guide 11. Further, the light guide 11 exemplified in FIG. 6 is provided with a fixing pin 104 locking with the frame 15 near the end face on the light source 10 side. In other words, the light guide 11 on the light source 10 side is fixed to the frame 15 and therefore effectively slides with reference to the light source 10 side. Accordingly, the stress occurring at the frame 15 and the light guide 11 due to the linear expansion difference can be greatly reduced.

It is preferable to select the material of the holder 16 from synthetic resins called engineering plastics in view of the elastic deformation and the slidability. Concretely, the holder 16 in the embodiment 2 is molded of the same resin as that of the embodiment 1. As a matter of course, the holder 16 may be a holder made of metal.

Further, two light guide receiving parts 305 are formed on both sides in the main-scan direction across the arm 300 as viewed in an arrow B direction illustrated in FIG. 7 as in the embodiment 1. Further, as illustrated in FIG. 8A and FIG. 8B, the surface of the light guide receiving part 305 in abutment with the light guide 11 as viewed in the main-scan direction and the surface of the arm 300 in abutment with the light guide 11 are formed to be substantially facing each other. As a matter of course, the surface of the light guide receiving part 305 in abutment with the light guide 11 is the surface defining the positional accuracy of the light guide 11 to be attached and is therefore precisely formed according to the shape and a designated value of the attachment position of the light guide 11.

The holder 16 is provided with the two light guide receiving parts 305 side by side in the main-scan direction and therefore can stably grip the rod-like light guide 11 extending in the main-scan direction. Accordingly, the number of the holders 16 to be attached to the positioning part 500 can be reduced, thereby contributing to the reduction in cost in production management of the CIS unit 4.

Next, the attachment of the holder 16 to the positioning part 500 will be described. In the state that the holder 16 is attached to the positioning part 500 as illustrated in FIG. 11, a pressing part body 307 of the holder 16 is in substantially close contact with one inner wall 503 of the positioning part 500, and the light guide receiving part 305 of the holder 16 is in substantially close contact with another inner wall 505 of the positioning part 500. Similarly, the lower surface of the holder 16 is in substantially close contact with the bottom surface 504 of the positioning part 500. The shape of the holder 16 is formed in a dimension with which the holder 16 is attached to be in substantially close contact with the positioning part 500. As a result, the holder 16 is attached to the positioning part 500 of the frame 515 with high positional accuracy, and the light guide 11 is attached to the light guide receiving part 305 of the holder 16 with high positional accuracy. In particular, the pressing part body 307 of the holder 16 is pressed from the one inner wall 503 of the positioning part 500 via a bulging part 309 as in the embodiment 1. As a result, a pressing force pressing the holder 16 into the other inner wall 505 of the positioning part 500 is generated and can firmly fix the holder 16 to the positioning part 500.

Next, as an aspect of the embodiment 2, an example of the attachment of four light guides based on the structure of the holder 16 and the positioning part 500 provided at the frame 515 will be described.

Example 1

An example 1 corresponds to a CIS unit for use in the sheetfeed-type image reading apparatus with a cover glass attached thereto. In particular, the example 1 is a CIS unit intended for the image reading apparatus with a small original width and is advantageous in the case where the length of the light guide is relatively short. The light guide in such a CIS unit has a sectional shape in the sub-scan direction with a small difference depending on the position in the longitudinal direction or has the same sectional shape over almost the whole length. Even in this sectional shape, the difference in luminance distribution in the longitudinal direction of the light guide is small. Hereinafter, the details of the example 1 will be described.

In the example 1, three pieces of the same holder 16 were produced. The holders 16 are formed to have an outside dimension inscribed in the positioning part 500 and to have the same inner size "a" of the annular shape illustrated in FIG. 8. The three holders 16 grip one light guide 11 to be attached to the positioning part 500. In this event, the orientations of the holders 16 and the positional relation between the light entering surface 101 and the emission surface 102 of the light guide 11 are confirmed to be correct.

Then, the three holders 16 are slid along the side surfaces of the light guide 11 and moved targeting the vicinity of both ends and the middle position in the longitudinal direction of the light guide 11. A set of the assembled three holders 16 and gripped light guide 11 is inserted into the positioning part 500 so that the light entering surface 101 of the light guide 11 faces the light source 10. Then, the cover glass 17 is attached to the frame 515 by a predetermined method.

Figure 12A:
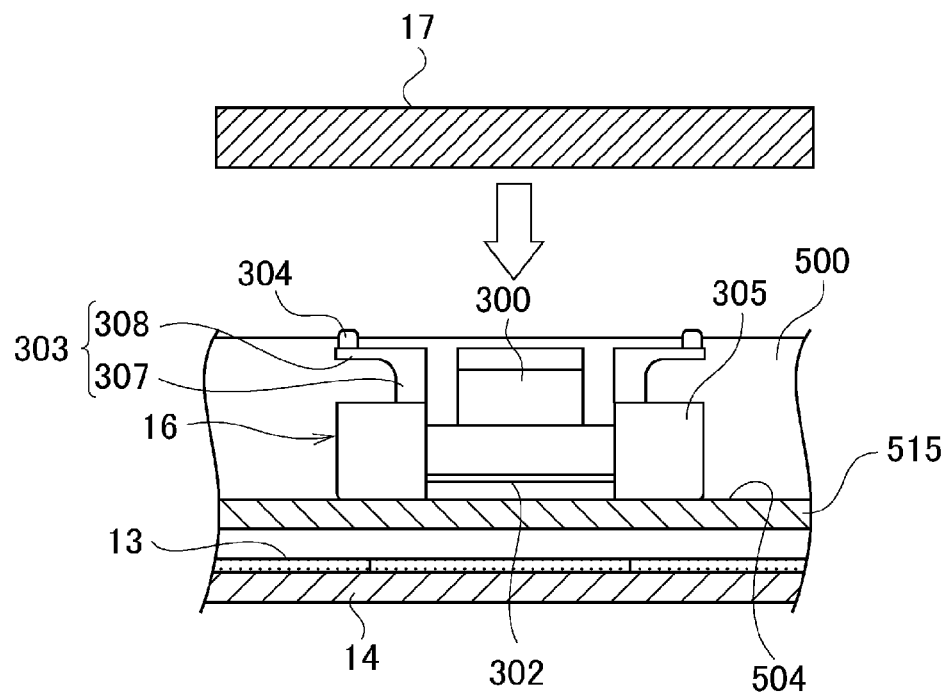
FIG. 12A is a sectional view in the main-scan direction for explaining an example of the relation between the frame 515, the holder 16 and the cover glass 17 to which the embodiment 2 is applicable.
Figure 12B:
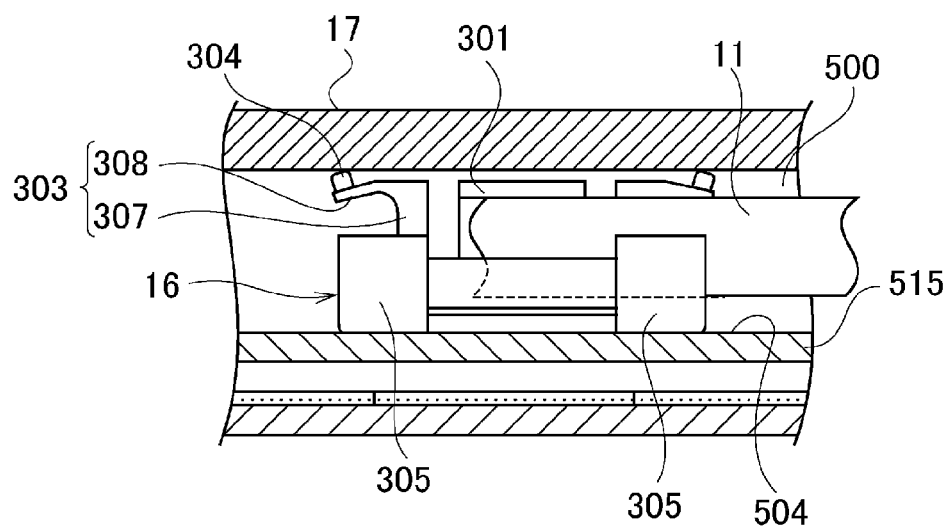
FIG. 12B is a sectional view in the main-scan direction for explaining an example of the relation between the frame 515, the holder 16 and the cover glass 17 to which the embodiment 2 is applicable.

FIG. 12A is a view illustrating the state of the CIS unit before the cover glass 17 is attached thereto. FIG. 12B is a view illustrating the state of the CIS unit after the cover glass 17 is attached thereto. Note that FIG. 12A illustrates the state with the light guide 11 omitted, and FIG. 12B illustrates the state with a part of the light guide 11 omitted.

As illustrated in FIG. 12B, projections 304 are pushed down by the rear surface of the cover glass 17 attached to the frame 515, and hook parts 308 of the right and left pressing parts 303 are accordingly elastically deformed and pushed down. As a result, the elastic force generated in the pressing parts 303 generates a pressing force pressing the holder 16 to the bottom surface 504 side. Accordingly, the holder 16 is fixed while being pressed against the bottom surface 504 of the frame 515, and the light guide 11 is attached to the frame 515 while being gripped by the holder 16.

Conversely, for detaching the light guide 11, the cover glass 17 is removed from the frame 515 and then the set of the three holders 16 and the gripped light guide 11 is pulled up from the positioning part 500. Then, the light guide 11 is detached from each holder 16, with which detachment of the light guide 11 is completed.

Note that as illustrated in FIG. 7, the pressing part 303 provided at the holder 16 is formed in a shape coupling with the coupling part 306 to decrease the influence of the pressing force exerted on the arm 300 and the light guide receiving part 305 gripping the light guide 11.

The work of attachment and detachment of the light guide 11 to/from the frame 515 in the example 1 can be easily performed without requiring special tool and measurement device or skill. Further, the detached light guide 11 and holder 16 are never deteriorated and reduced in quality due to the work of attachment and detachment and can be reused.

Further, since the positioning part 500 is designed so that the holder 16 can be attached at any position of the positioning part 500 in the example 1, the light guide 11 can be assembled to the positioning part 500 without consideration of the position of the holder 16 in the main-scan direction.

Example 2

An example 2 fixes a holder gripping a light guide to a positioning part by a hooking claw-type snap-fit (barbed-leg-type snap-fits). Hereinafter, characteristic points different from the description until the end of the example 1 will be described.

As illustrated in FIG. 11, a locking claw 302 having a tip formed in a hooking-claw shape is provided at the holder 16. The locking claw 302 is locked with a locking projection 502 formed on the inner wall 505 in a shape corresponding to the locking claw 302, whereby the holder 16 is pressed and fixed to the bottom surface 504. The shape of the lower surface of the locking projection 502 is made into a shape which can be appropriately locked at the tip in the hooking-claw shape of the locking claw 302 to realize the snap-fit of the hooking-claw type.

Further, the locking projection 502 is formed such that the length thereof in the main-scan direction has the dimension conforming to an inner size "c" between the two light guide receiving parts 305 of the holder 16 illustrated in FIG. 7. When attaching the holder 16 to the positioning part 500, the holder 16 is attached so that the locking projection 502 is inserted between the two light guide receiving parts 305. By attaching the holder part 16 in this manner, the holder 16 is fixed in the positioning part 500 without deviating in the main-scan direction and the light guide 11 gripped by the holder 16 is attached to the frame 515 with high positional accuracy. In short, the positioning of the holder 16 in the main-scan direction is performed using the locking projection 502 in the snap-fit shape.

When detaching the holder 16, the light guide 11 is first pulled out from each holder 16 by expanding the arm 300 upward from the state that the holder 16 is attached to the positioning part 500. Then, the holder 16 is inclined to the rod-lens array 12 side to release the elastic lock (snap-fit) between the locking claw 302 and the locking projection 502 and then pulled up, whereby the holder 16 can be easily detached.

Note that though a set of snap-fit is provided for one holder 16 as illustrated in FIG. 11 is described in the example 2, a plurality of sets of snap-fits may be provided.

Example 3

The example 3 uses a plurality of positioning projections provided inside the positioning part 500 in place of the function of fixing the holder by the locking groove in the embodiment 1.

Figure 13A:
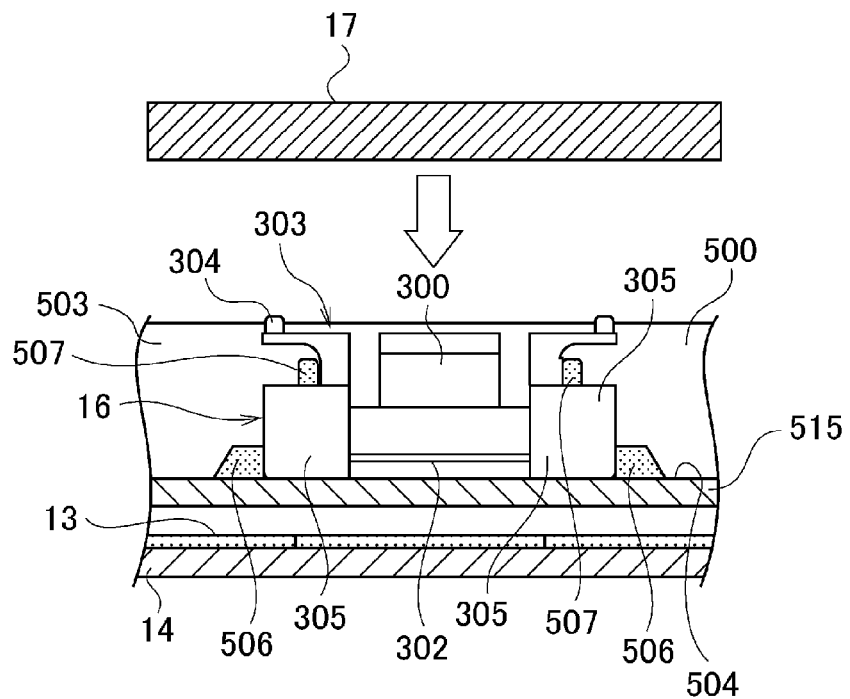
FIG. 13A is a sectional view in the main-scan direction for explaining an example of the relation between the frame 515, the holder 16 and the cover glass 17 to which the embodiment 2 is applicable.
Figure 13B:
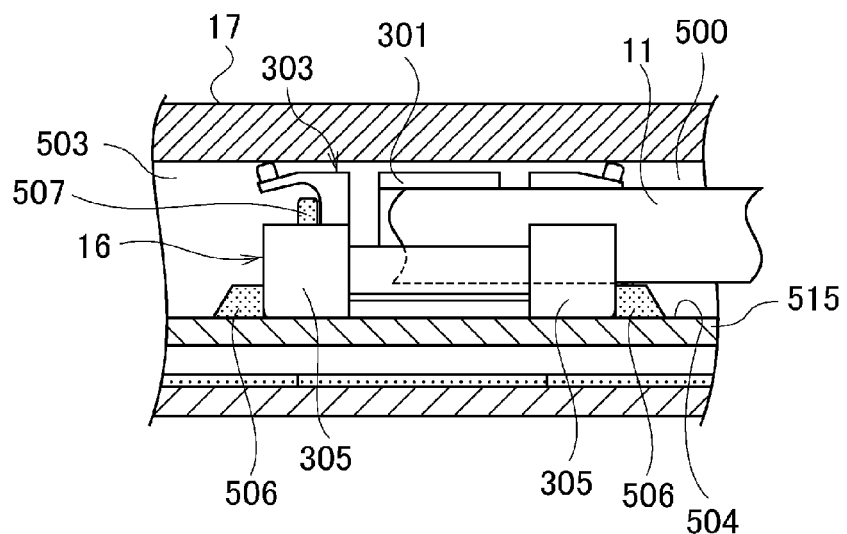
FIG. 13B is a sectional view in the main-scan direction for explaining an example of the relation between the frame 515, the holder 16 and the cover glass 17 to which the embodiment 2 is applicable.
Figure 14:
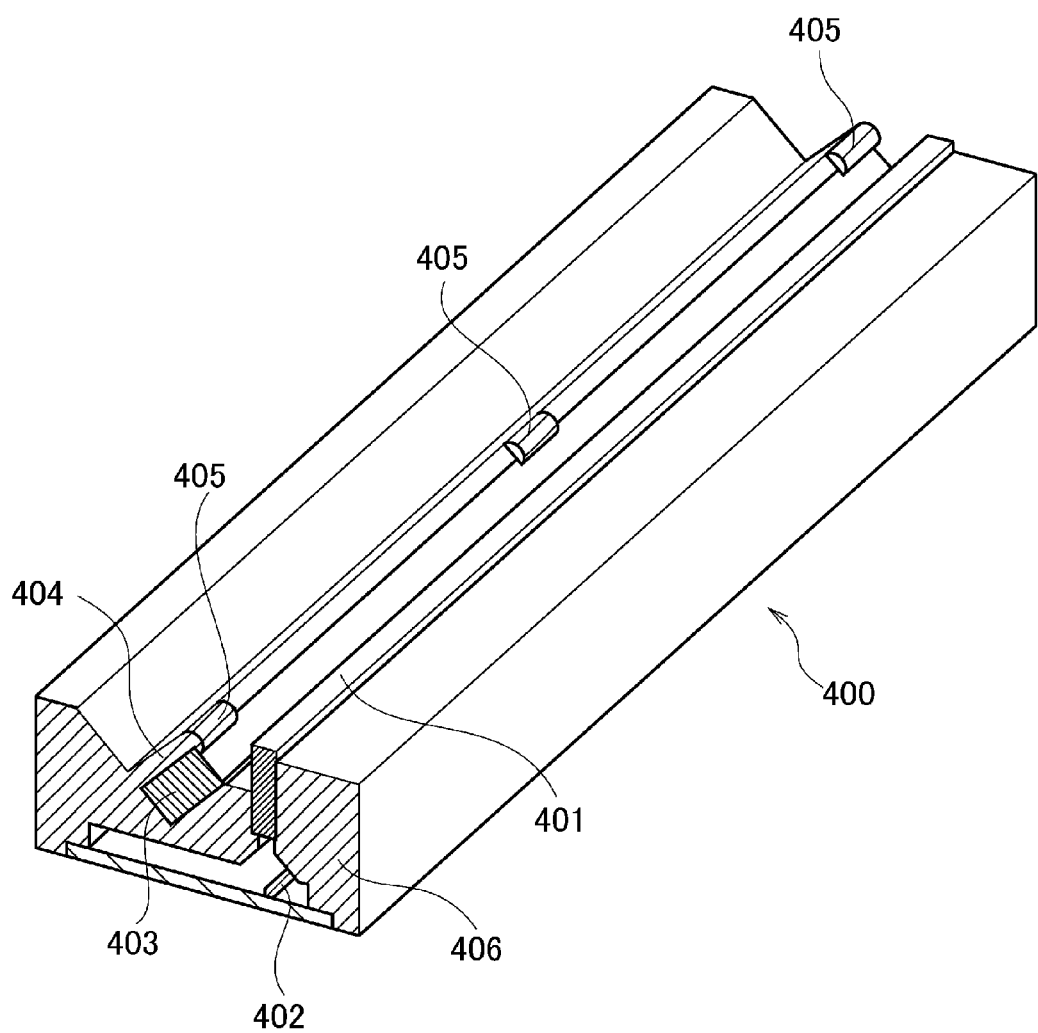
FIG. 14 is a perspective view illustrating the structure of an example of a conventional contact image sensor unit.

FIG. 13A and FIG. 13B are sectional views of the frame 515 cut in the main-scan direction. FIG. 13A is a view illustrating the state of the CIS unit before the cover glass 17 is attached thereto. FIG. 13B is a view illustrating the state of the CIS unit after the cover glass 17 is attached thereto. At the bottom surface 504 of the positioning part 500, positioning projections 506 in abutment with the two light guide receiving parts 305 to hold them from both sides are formed separately in the main-scan direction. The two positioning projections 506 are in abutment with the light guide receiving parts 305, whereby the holder 16 is fixed without displacement in the main-scan direction inside the positioning part 500.

Further, on the inner wall 503 of the positioning part 500, positioning projections 507 in abutment with the two pressing parts 303 to hold them from both sides are formed separately in the main-scan direction. The two positioning projections 507 are in abutment with the pressing parts 303, whereby the holder 16 is fixed without displacement in the main-scan direction inside the positioning part 500.

Note that the positioning projections 506, 507 are designed not to interfere with the holder 16 when the holder 16 is pulled upward and detached from the positioning part 500. Further, the numbers, shapes and design positions of the positioning projections need to be determined in consideration of the fixing force and the convenience of the frame molding. Further, the detachment of the light guide 11 can be performed as in the example 2.

Example 4

An example 4 relates to a CIS unit in which two illumination devices each composed of a light source and a light guide, provided at the right and left of the rod-lens array 12 at the middle as illustrated in FIG. 11. In particular, a case where the set angle of the emission direction of the light guide, and the shape, material and the like of the light guide vary between right and left will be described. For example, the shapes of the holder of the arm and the surface of the light guide receiving part which grips and is in contact with the light guide sometimes slightly vary different between right and left though the differences are small. Particularly when the outer diameter of the rod-like light guide for use is several millimeters or smaller, it takes time to visually recognize the slight difference. The CIS unit having the difference between right and left may increase the complexity in production management and cause confusion. However, in the production process, the holders for right and for left need to be easily distinguished and managed without confusion and assembled without fail.

Hence, in the example 4, the sectional shapes in the sub-scan direction of the two positioning parts 500 were formed different between right and left to be distinguishable. Further, the shapes of the holders 16 attached to the two positioning parts 500 were also formed to be different between right and left to be distinguishable. Accordingly, the holder 16 wrongly attached can be easily distinguished at a glance of the attachment state at the positioning part 500. As a matter of course, the arms 300 of the holders 16 for right and for left and the light guide receiving parts 305 are shaped to conform to the light guides 11 on the right and left sides to be gripped respectively.

Concretely, as illustrated in FIG. 11, the height of the inner wall 503 of the right positioning part 500b is formed to be smaller than the height of the inner wall 503 of the left positioning part 500a. Further, in conformity to the shapes of the positioning parts 500a, 500b, the height of a corresponding right holder 16b is formed to be smaller than the height of a left holder 16a. Accordingly, the distinguishability for the right and left holders 16 at the time of assembling the CIS unit can be improved. As a result, the wrong work in assembling the light guides 11 can be reduced to improve the productivity. Further, the method of attaching or detaching the light guide in the example 4 is available by employing the method in the example 2 or 3 and is easy as in the examples.

As described above, for each of the CIS units in the examples 1 to 4 of the embodiment 2, the work of attaching and detaching the light guide to/from the frame 15 can be easily performed without requiring special tool and measurement device or skill. Further, the used holder and light guide are not deteriorated and reduced in quality due to the work of attachment and detachment and can be reused.

Further, the CIS unit of the example 1 requires the cover glass 17 when the light guide 11 is attached and fixed to the frame 515. Accordingly, the CIS unit of the example 1 is effective when it is installed in the sheetfeed-type image reading apparatus.

Further, in the CIS units of the examples 2 to 4, the light guide 11 can be satisfactorily attached thereto even without the cover glass 17. However, when the cover glass 17 is attached, the light guide 11 and the holder 16 gripping the light guide 11 are strongly fixed by the frame 515. Accordingly, the CIS units of the examples 2 to 4 are mountable in both of the flatbed-type and the sheetfeed-type.

Further, in the CIS unit according to the present invention, the positional accuracy of the light guide 11 to the frame can be obtained with high accuracy with respect to the temperature change during the assembly and thereafter. Further, molding the frame to which the present invention is applied does not require particular difficulty and complexity as compared to the conventional frame molding.

In the foregoing, according to the embodiment 1 and the embodiment 2, the light guide can be attachably/detachably attached to the positioning part via the holder attachably/detachably supporting the light guide without using an adhesive. Accordingly, the holder and the light guide can be attached and detached during the manufacture and after the assembly of the CIS unit, so that the light guide can be easily exchanged. Further, even if dust and the like enter during the manufacture and after the assembly of the CIS unit, correction work can be easily performed because the holder and the light guide can be attached and detached.

Further, even if the shape of the light guide is modified according to the usage situation, it becomes possible to exchange only the light guide for the usage without changing the shape of the frame by preparing the holder conforming to the shape of the light guide.

Furthermore, the holder is formed of the synthetic resin having the self-lubricating property or the synthetic resin containing a solid lubricant. Accordingly, even if the light guide gripped by the holder slides in the longitudinal direction in the holder by the deformation thereof caused by the thermal expansion and/or contraction due to a change in environmental temperature, the flaw caused on the surface of the light guide can be reduced. Similarly, even if the friction occurs due to attachment and detachment of the light guide to/from the holder, the flaw caused on the surface of the light guide can be reduced.

Further, the holder grips the light guide so that the light guide can slide in the longitudinal direction of the light guide. Therefore, even if the light guide expands or contracts due to an environmental change, the light guide slides in the longitudinal direction, thereby preventing deformation of the holder and the frame.

Further, since the holder can be produced in a shape conforming to various shapes, attachment angles and so on of the light guide, the frame can be formed in the same shape irrespective of the shape of the light guide. Accordingly, the frame can be made uniform to make the production management more efficient.

Further, in the case of using the above-described contact image sensor unit in the image reading apparatus, only the light guide can be easily exchanged for a failure caused by the light guide, whereas the holder and the light guide can be easily exchanged for increasing the performance of the light guide or for change of the attachment position or angle.

INDUSTRIAL APPLICABILITY

The present invention can be effectively used for a contact image sensor unit, and an image reading apparatus such as a scanner, facsimile, copying machine and so on using it.

The invention claimed is:

1. A contact image sensor unit, comprising:
a light source configured to illuminate an original;
a rod-like light guide configured to guide light from said light source to the original;
an imaging element configured to form reflected light from the original on a plurality of photoelectric conversion elements;
a sensor substrate on which said plurality of photoelectric conversion elements are mounted;
a frame to which said light source, said light guide, said imaging element, and said sensor substrate are attached and which has a positioning part for attaching said light guide thereto; and
a plurality of supporting members which attachably/detachably and slidably support said light guide and are attachably/detachably attached to said positioning part, said plurality of supporting members supporting said light guide and said light guide being slidable in a main-scan direction.

2. The contact image sensor unit according to claim 1, wherein said supporting member is provided with a light guide receiving part and an arm which are coupled to each other via a coupling part, and
wherein said light guide receiving part and said arm grip said light guide.

3. The contact image sensor unit according to claim 2, wherein said arm has an elastic force in a direction in which said arm grips said light guide.

4. The contact image sensor unit according to claim 2, wherein said light guide receiving part and said arm are provided at positions facing each other when viewed in the main-scan direction, and
wherein said light guide receiving part is provided on either side in the main-scan direction across said arm.

5. The contact image sensor unit according to claim 2, wherein said supporting member is provided with an elastically deformable pressing part coupling to said coupling part, and
wherein said pressing part is elastically deformed by a cover glass attached to said frame to press said supporting member in a direction of a bottom surface of said positioning part.

6. The contact image sensor unit according to claim 5, wherein said pressing part is provided with a pressing part body coupling to said coupling part and a hook part formed in a bent shape starting from said pressing part body.

7. The contact image sensor unit according to claim 5, wherein said pressing part is provided with a projection projecting upward, and
wherein a top portion of said projection is located at a height projecting from an upper surface of said frame in a state that said supporting member is attached to said positioning part.

8. The contact image sensor unit according to claim 2, wherein said supporting member is provided with an elastically deformable pressing part coupling to said coupling part, and
wherein said pressing part is elastically deformed by one inner wall of said positioning part to press said supporting member in a direction of another inner wall of said positioning part.

9. The contact image sensor unit according to claim 1, wherein said supporting member is provided with a locking claw,
wherein said positioning part is provided with a locking projection which locks said locking claw, and
wherein said supporting member is attached to said positioning part by locking said locking claw to said locking projection by snap-fit.

10. The contact image sensor unit according to claim 9, wherein said supporting member is provided with a light guide receiving part and an arm which are coupled to each other via a coupling part,
wherein said light guide receiving part is provided on both sides in the main-scan direction across said arm, such that said supporting member is provided with two light guide receiving parts,
wherein said locking claw is provided between said two light guide receiving parts, and
wherein said locking projection is formed to have a length in the main-scan direction having a dimension between said two light guide receiving parts and is locked with said locking claw to position said supporting member in the main-scan direction.

11. The contact image sensor unit according to claim 1, wherein said positioning part is provided with a positioning projection in abutment with said positioning member to position said supporting member in the main-scan direction.

12. The contact image sensor unit according to claim 1, wherein said positioning part has a bottom surface and an inner wall formed adjacent to the bottom surface, and
wherein a width dimension of the bottom surface is equal to a height dimension of the inner wall when viewing said positioning part in the main-scan direction.

13. The contact image sensor unit according to claim 1, wherein two sets of said light source and said light guide are provided,
wherein said positioning part corresponding to said light guide in each of the sets is provided, and
wherein sectional shapes of said two positioning parts are formed different to be distinguishable when viewed in the main-scan direction.

14. The contact image sensor unit according to claim 1, wherein said positioning part is provided with a locking groove to which said supporting member is attached.

15. The contact image sensor unit according to claim 14, wherein said supporting member is provided with a locking claw,
wherein said locking groove is provided with a locking projection which locks said locking claw, and
wherein said supporting member is attached to said locking groove by locking said locking claw to said locking projection by snap-fit.

16. The contact image sensor unit according to claim 1, wherein said supporting member is formed of a synthetic resin with a self-lubricating property.

17. The contact image sensor unit according to claim 1, wherein said supporting member is formed of a synthetic resin containing a solid lubricant.

18. The contact image sensor unit according to claim 1, wherein said light guide is provided with a fixing pin supporting said frame, near an end face on said light source side.

19. The contact image sensor unit according to claim 1, wherein said supporting member supports said light guide with said light guide separated from said frame when viewing a portion of said supporting member supporting said light guide in the main-scan direction.

20. An image reading apparatus comprising:
a casing; and
a contact image sensor unit;
wherein said contact image sensor unit includes, a light source configured to illuminate an original, a rod-like light guide configured to guide light from said light source to the original, an imaging element configured to form reflected light from the original on a plurality of photoelectric conversion elements, a sensor substrate on which said plurality of photoelectric conversion elements are mounted, a frame to which said light source, said light guide, said imaging element, and said sensor substrate are attached and which has a positioning part for attaching said light guide thereto, and a plurality of supporting members which attachably/detachably and slidably support said light guide and are attachably/detachably attached to said positioning part, said plurality of supporting members supporting said light guide and said light guide being slidable in a main-scan direction.

21. A contact image sensor unit, comprising:
a light source configured to illuminate an original;
a rod-like light guide configured to guide light from said light source to the original;
an imaging element configured to form reflected light from the original on a plurality of photoelectric conversion elements;

a sensor substrate on which said plurality of photoelectric conversion elements are mounted;

a frame to which said light source, said light guide, said imaging element, and said sensor substrate are attached and which has a positioning part for attaching said light guide thereto; and a plurality of supporting members which attachably/detachably and slidably support a portion in a longitudinal direction of said light guide and are attachably/detachably attached to said positioning part, said plurality of supporting members supporting said light guide and said light guide being slidable in a main-scan direction.

* * * * *

UNITED STATES PATENT AND TRADEMARK OFFICE
CERTIFICATE OF CORRECTION

PATENT NO.       : 9,253,359 B2
APPLICATION NO.  : 13/519353
DATED            : February 2, 2016
INVENTOR(S)      : Hidehisa Takahashi It is certified that error appears in the above-identified patent and that said Letters Patent is hereby corrected as shown below:

In The Specification

In column 4, line 40, the word "in" appears instead of "pin". Column 4, line 40, should read:
--Further, the light guide is provided with a fixing pin support- --

In column 6, line 63, the words "(not illustrated)" should be deleted. Column 6, line 63, should read:
--ated from the light source 10 to the original.--

In column 7, line 6, the words "a coupling" should be deleted. Column 7, line 6, should read:
--array can also be used as an imaging element of the--

Signed and Sealed this
Fourteenth Day of June, 2016

Michelle K. Lee
*Director of the United States Patent and Trademark Office*